(12) United States Patent
Nishio

(10) Patent No.: US 6,385,240 B2
(45) Date of Patent: *May 7, 2002

(54) PROGRESSIVE IMAGE SIGNAL TRANSMITTER, PROGRESSIVE IMAGE SIGNAL RECEIVER AND, MEDIUM

(75) Inventor: Toshiroh Nishio, Hirakata (JP)

(73) Assignee: Matsushita Electric Industrial Co, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/254,692
(22) PCT Filed: Jul. 13, 1998
(86) PCT No.: PCT/JP98/03122
  § 371 Date: Jun. 14, 1999
  § 102(e) Date: Jun. 14, 1999
(87) PCT Pub. No.: WO99/04569
  PCT Pub. Date: Jan. 28, 1999

(30) Foreign Application Priority Data

Jul. 15, 1997 (JP) ............................................. 9-189396

(51) Int. Cl.[7] ................................................. H04B 1/66
(52) U.S. Cl. ........................ 375/240; 386/131; 386/46
(58) Field of Search ........................ 375/240; 348/446, 348/448, 429, 445, 46, 556; 386/558, 131, 46

(56) References Cited

U.S. PATENT DOCUMENTS

| 4,881,125 A | 11/1989 | Krause |
| 4,998,287 A | 3/1991 | Katznelson et al. |
| 5,461,420 A | 10/1995 | Yonemitsu et al. |
| 5,550,592 A | 8/1996 | Markandey et al. |
| 5,563,660 A | 10/1996 | Tsukagoshi |

(List continued on next page.)

FOREIGN PATENT DOCUMENTS

| EP | 4-40788 | 2/1992 |
| EP | 0 782 334 | 7/1997 |
| JP | 2-199969 | 8/1990 |
| JP | 2-199970 | 8/1990 |
| JP | 5-328317 | 12/1993 |

(List continued on next page.)

OTHER PUBLICATIONS

"Point–Illustrative Latest MPEG Textbook", supervised by Hiroshi Fujiwara, Aug. 1, 1994, Ascii Corp. p. 159–160.

"ITU–T White Book (H–Series Recommendations) Concerning Audiovisual/Multimedia (Recommendations H.200–H.331)", Feb. 18, 1995, New ITU Association of Japan, p. 404–407.

International Search Report corresponding to application No. PCT/JP98/03122 dated Nov. 10, 1998.

ISO/IEC 13818–2: 1995 (E), Recommendation ITU–T H.262, Information Technology—Generic Coding of Moving Pictures and Associated Audio Information: Video, pp. 1–68, Mar. 31, 1995.

International Search Report corresponding to application No. PCT/JP98/03122 dated Nov. 10, 1998.

*Primary Examiner*—Chris Kelley
*Assistant Examiner*—Shawn S. An
(74) *Attorney, Agent, or Firm*—Ratner & Prestia

(57) ABSTRACT

There are provided MPEG2 video encoding means 102 for converting a progressive signal to a bitstream 512 in accordance with the format of ISO/IEC 13818-2, flag bit analyzing means 503 for extracting, from the bitstream 512, data on the frame rate of a material and adaptably specifying a rate doubling method, second MPEG2 video decoding means 504 for receiving the bitstream, reconstructing an image signal from the bitstream, and outputting the progressive signal, and the like, whereby a progressive output conforming to the frame rate of a display system and free from image quality degradation is obtained.

5 Claims, 17 Drawing Sheets

U.S. PATENT DOCUMENTS

| | | | | |
|---|---|---|---|---|
| 5,594,552 A | * | 1/1997 | Fujinami et al. | 348/446 |
| 5,703,654 A | | 12/1997 | Iizuka | |
| 5,742,351 A | | 4/1998 | Guede | |
| 5,852,565 A | * | 12/1998 | Demos | 348/429 |
| 6,072,531 A | * | 6/2000 | Shibano | 348/448 |

FOREIGN PATENT DOCUMENTS

| | | |
|---|---|---|
| JP | 6-22299 | 1/1994 |
| JP | 6-30332 | 2/1994 |
| JP | 6-178274 | 6/1994 |
| JP | 6-197273 | 7/1994 |
| JP | 6-326985 | 11/1994 |
| JP | 7-99603 | 4/1995 |
| JP | 8-163555 | 6/1996 |
| JP | 8-186812 | 7/1996 |
| JP | 8-307837 | 11/1996 |
| JP | 9-74564 | 3/1997 |
| JP | 9-181967 | 7/1997 |

* cited by examiner

Fig. 2
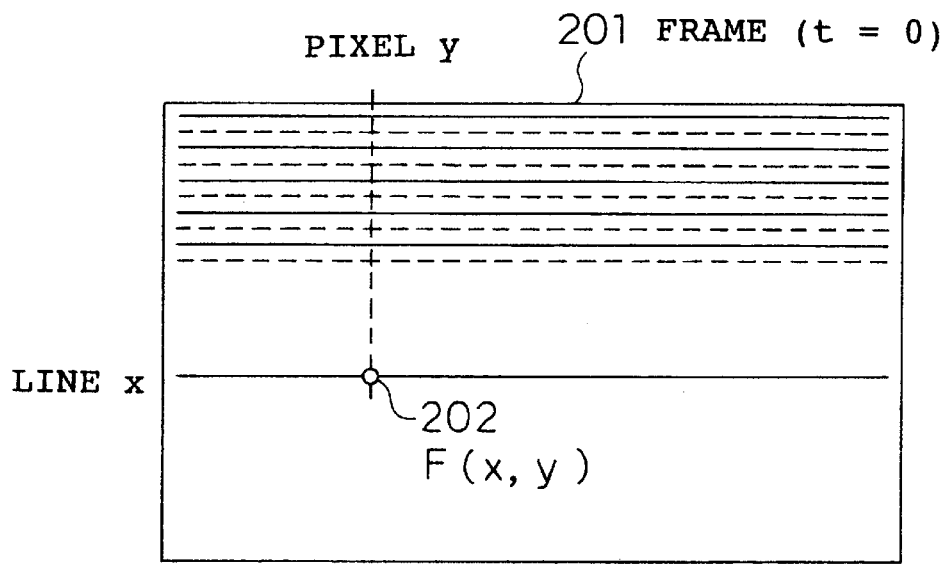
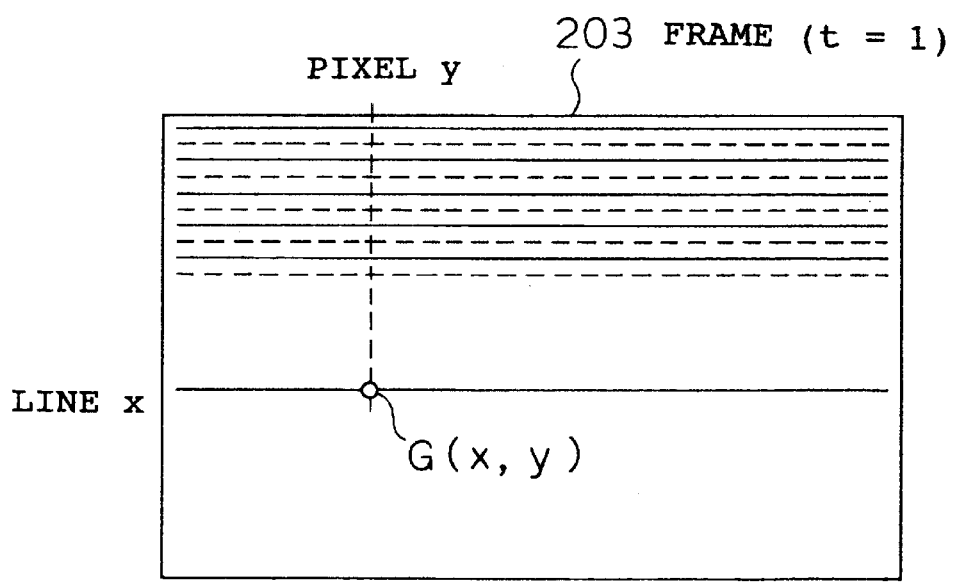

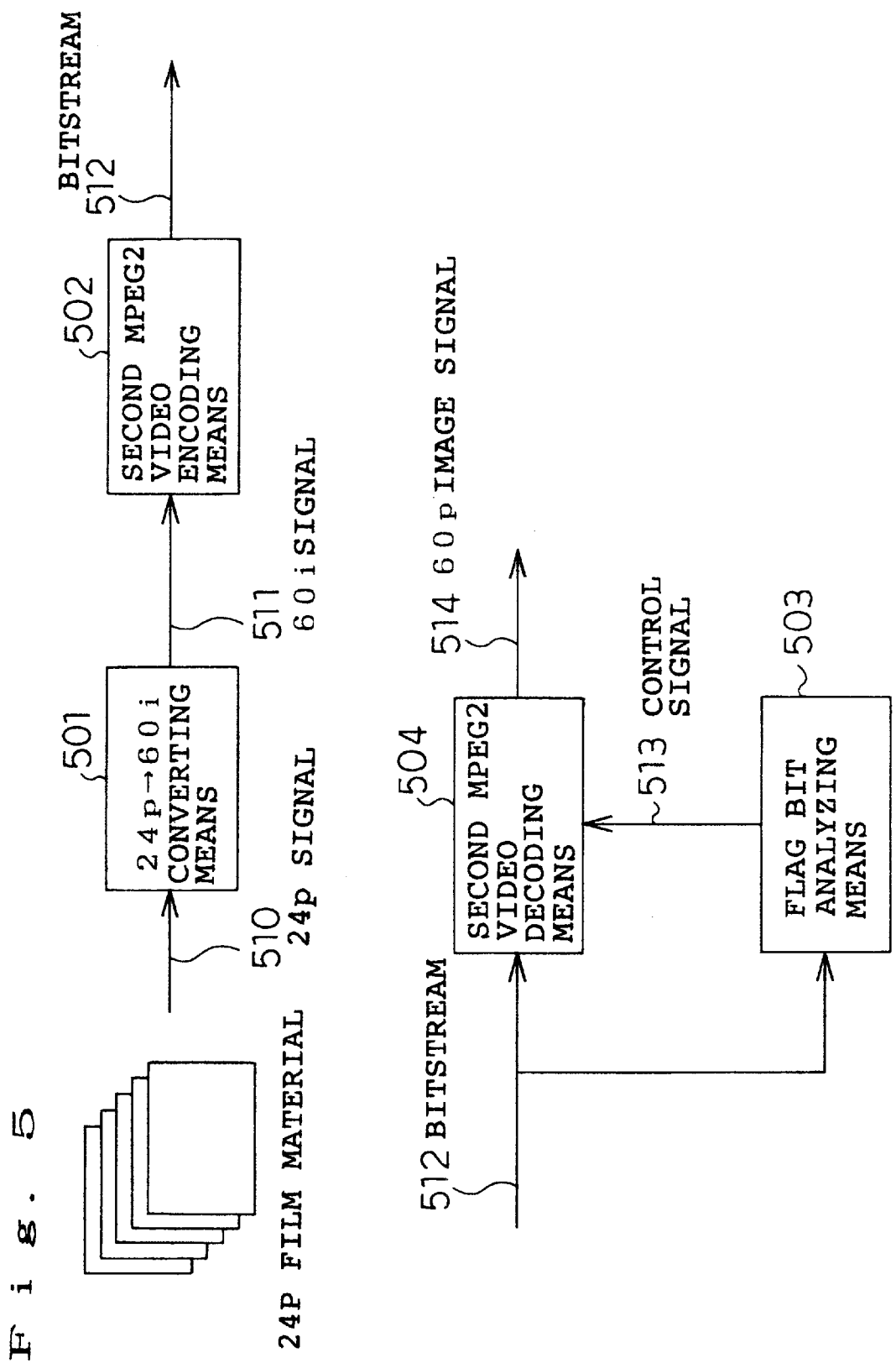

Fig. 6

Picture coding extension

| picture_coding_extension ( ) { | No. of bits | Mnemonic |
|---|---|---|
| extension_start_code | 32 | bslbf |
| extension_start_code_identifier | 4 | uimsbf |
| f_code[0][0] | 4 | uimsbf |
| f_code[0][1] | 4 | uimsbf |
| f_code[1][0] | 4 | uimsbf |
| f_code[1][1] | 4 | uimsbf |
| intra_dc_prediction | 2 | uimsbf |
| picture_structure | 2 | uimsbf |
| top_field_first | 1 | uimsbf |
| frame_pred_frame_dct | 1 | uimsbf |
| concealment_motion_vectors | 1 | uimsbf |
| q_scale_type | 1 | uimsbf |
| intra_vlc_format | 1 | uimsbf |
| alternate_csan | 1 | uimsbf |
| repeat_first_field | 1 | uimsbf |
| chroma_420_type | 1 | uimsbf |
| progressive_frame | 1 | uimsbf |
| composite_display_flag | 1 | uimsbf |
| if(composite_display_flag) { | | |
| v_axis | 1 | uimsbf |
| field_sequence | 3 | uimsbf |
| sub_carrier | 1 | uimsbf |
| burst_amplitude | 7 | uimsbf |
| sub_carrier_phase | 8 | uimsbf |
| } | | |
| next_start_code( ) | | |
| } | | |

Fig. 9

Sequence header

| sequence_header() { | No. of bits | Mnemonic |
|---|---|---|
| sequence_header_code | 32 | bslbf |
| horizontal_size_value | 12 | uimsbf |
| vertical_size_value | 12 | uimsbf |
| aspect_ratio_information | 4 | uimsbf |
| frame_rate_code | 4 | uimsbf |
| bit_rate_value | 18 | uimsbf |
| marker_bit | 1 | bslbf |
| vbv_buffer_size_value | 10 | uimsbf |
| constrained_parameters_flag | 1 | bslbf |
| load_intra_quantiser_matrix | 1 | uimsbf |
| if(load_intra_quantiser_matrix) | | |
| intra_quantiser_matrix[64] | 8×64 | uimsbf |
| load_non_intra_quantiser_matrix | 1 | uimsbf |
| if(load_non_intra_quantiser_matrix) | | |
| non_intra_quantiser_matrix | 8×64 | uimsbf |
| next_start_code() | | |
| } | | |

Fig. 10

Sequence extension

| sequence_extension() { | No. of bits | Mnemonic |
|---|---|---|
| extension_start_code | 32 | bslbf |
| extension_start_code_identifier | 4 | uimsbf |
| profile_and_level_indication | 8 | uimsbf |
| progressive_sequence | 1 | uimsbf |
| chroma_format | 2 | uimsbf |
| horizontal_size_extension | 2 | uimsbf |
| vertical_size_extension | 2 | uimsbf |
| bit_rate_extension | 12 | uimsbf |
| marker_bit | 1 | bslbf |
| vbv_buffer_size_extension | 8 | uimsbf |
| low_delay | 1 | uimsbf |
| frame_rate_extension_n | 2 | uimsbf |
| frame_rate_extension_d | 5 | uimsbf |
| next_start_code() | | |
| } | | |

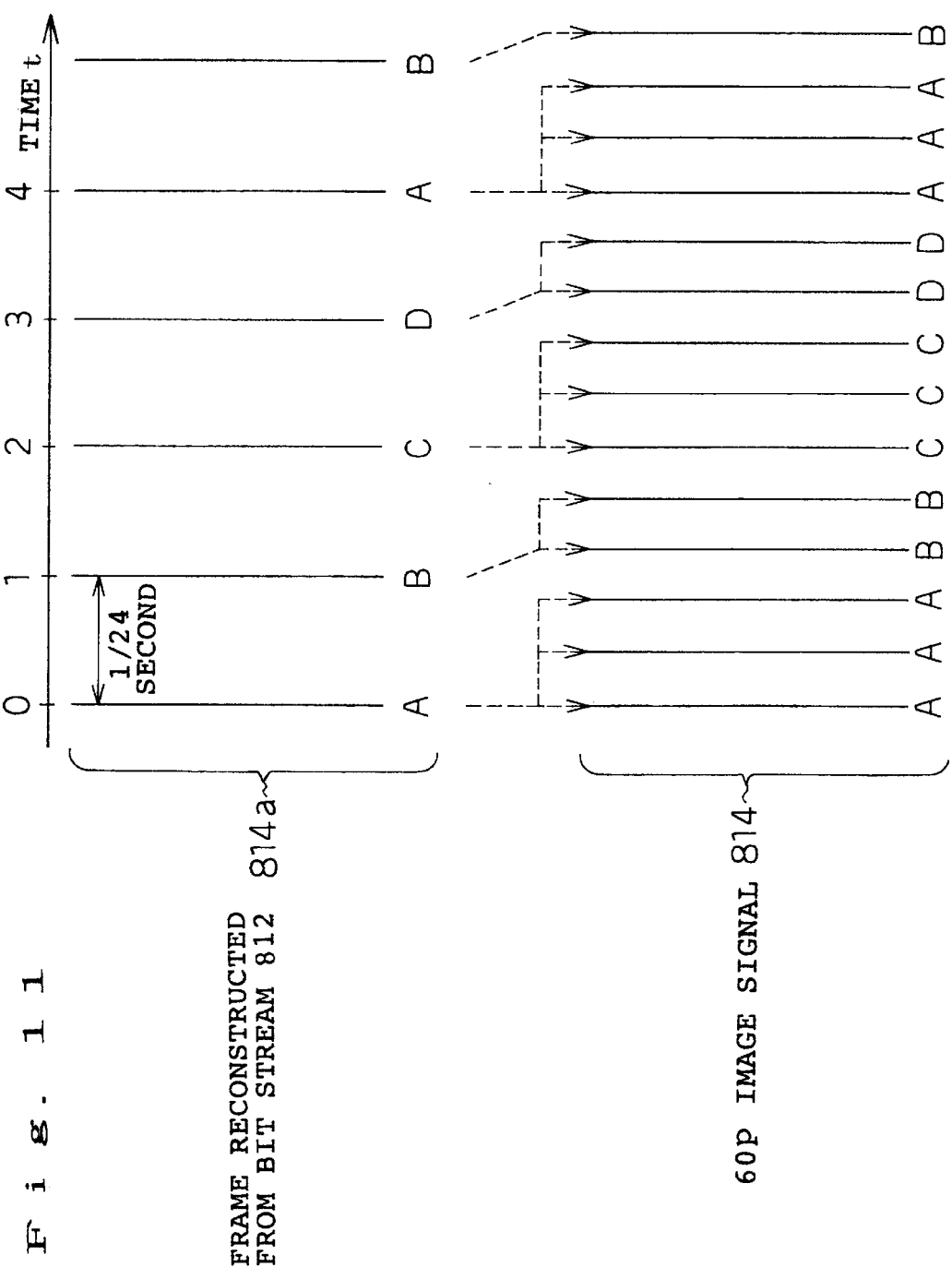

Fig. 12

Extension and user data

| extension_and_user_data(i) { | No. of bits | Mnemonic |
|---|---|---|
| while((nextbits()==extension_start_code) \|\| (nextbits()==user_data_start_code)) { | | |
| if((i!=1)&&(nextbits()==extension_start_code)) | | |
| extension_data(i) | | |
| if((nextbits()==user_data_start_code)) | | |
| user_data() | | |
| } | | |
| } | | |

User data

| user_data() { | No. of bits | Mnemonic |
|---|---|---|
| user_data_start_code | 32 | bslbf |
| while(nextbits()!='0000 0000 0000 0000 0000 0001') { | | |
| frame_code | 8 | uimsbf |
| } | | |
| next_start_code() | | |
| } | | |

Fig. 13 frame_code

| frame_code | FRAME RATE [frame/sec] | TYPE OF MATERIAL (progressive or interlace) |
|---|---|---|
| 0000 0000 | 24×1000/1001 | interlace |
| 0000 0001 | 24 | interlace |
| 0000 0010 | 25 | interlace |
| 0000 0011 | 30×1000/1001 | interlace |
| 0000 0100 | 30 | interlace |
| 0000 0101 | 50 | interlace |
| 0000 0110 | 60×1000/1001 | interlace |
| 0000 0111 | 60 | interlace |
| 0000 1000 | 24×1000/1001 | progressive |
| 0000 1001 | 24 | progressive |
| 0000 1010 | 25 | progressive |
| 0000 1011 | 30×1000/1001 | progressive |
| 0000 1100 | 30 | progressive |
| 0000 1101 | 50 | progressive |
| 0000 1110 | 60×1000/1001 | progressive |
| 0000 1111 | 60 | progressive |
| 0001 0000 0001 0001 ⋮ 1111 1110 1111 1111 | reserved | |

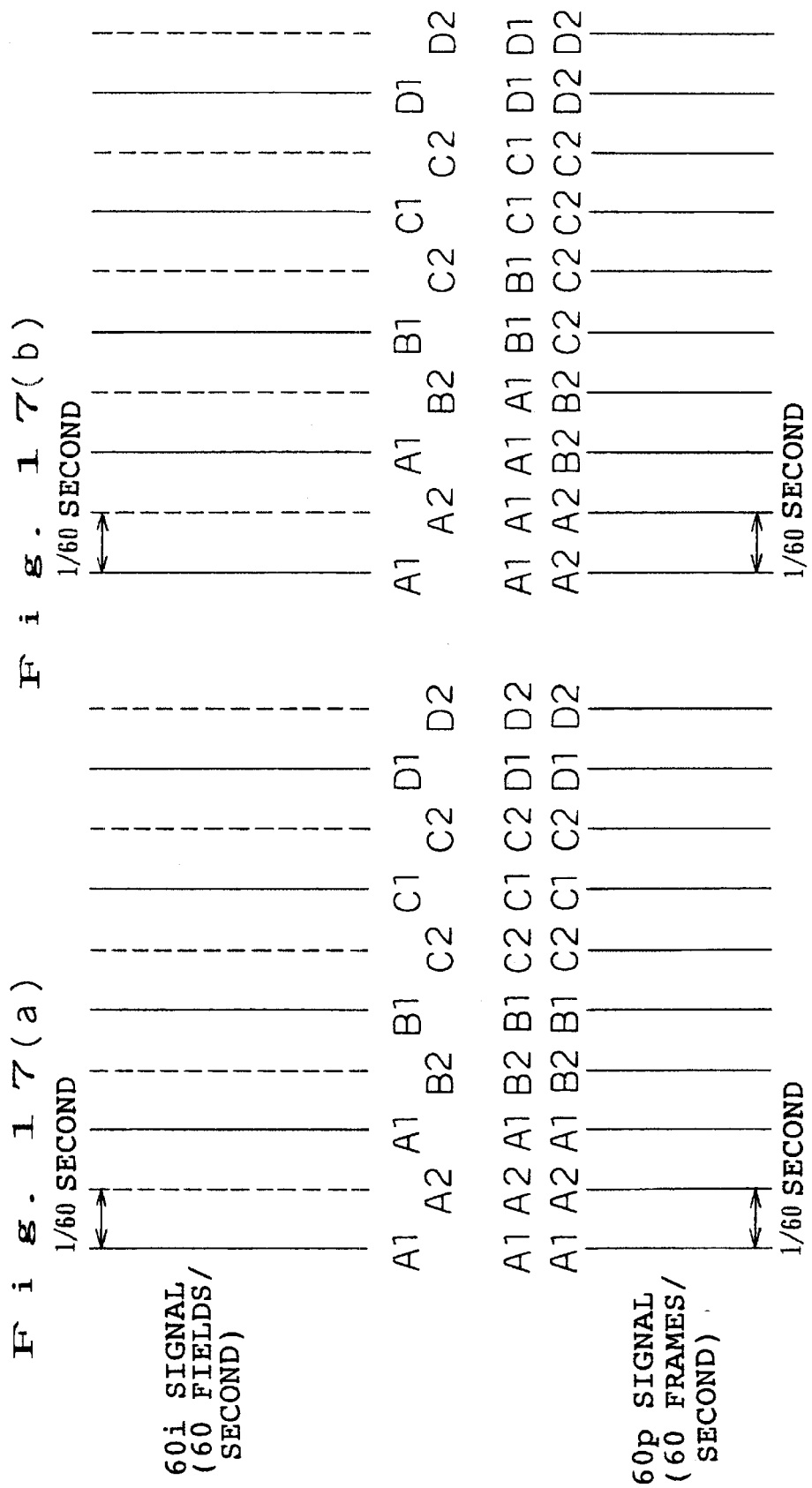

PROGRESSIVE IMAGE SIGNAL TRANSMITTER, PROGRESSIVE IMAGE SIGNAL RECEIVER AND, MEDIUM

This Application is a U.S. National Phase Application of PCT International Application PCT/JP98/03122.

TECHNICAL FIELD

The present invention relates to a progressive image signal transmitting apparatus, a progressive image signal receiving apparatus, and a method and a medium each using a bitstream obtained by encoding, e.g., a progressive video signal (sequential scanning signal) based on the MPEG2 formats.

BACKGROUND ART

In recent years, the international standardization of MPEG2 (Moving Picture Experts Group the 17-th phase 2) (registration in ISO/IEC 13818-1, 2, 3) has increased the importance of a digital transmission/reception system and method using digital high-efficiency encoding. The use of the MPEG2 encoding scheme has raised expectations for channel multiplexing, improved user interface, and diversified service based on the prospect of additional data transmission, while enabling simultaneous transmission of signals with various image qualities (resolutions) from a single transmitter. As a result, a sequential scanning signal with high image quality (progressive signal) can be transmitted in digital broadcasting.

Below, a description will be given to a conventional progressive signal transmission/reception system.

FIG. 13 is a block diagram showing the structure of the conventional progressive signal transmitting/receiving apparatus.

It is to be noted that, in the following description, an image structure is expressed by using signs i (interlace) and p (progressive) as abbreviations in order to distinguish whether the image structure is interlace or progressive and express a frame rate in a comprehensible manner. By way of example, a progressive signal at a rate of 24 frames per second may be described as 24$p$ and an interlace signal at a rate of 60 frames per second may be described as 60$i$.

In FIG. 15, a reference numeral 1301 denotes a view diagrammatically showing the structure of a video material recorded at a sampling rate of 24 frames per second, which is represented by a cinematic film material or the like. A reference numeral 1302 denotes a 24$p$/60$i$ converter for converting a picture at the rate of 24 frames/second to a normal NTSC television signal at a rate of 60 fields/second. A reference numeral 1303 denotes an MPEG2 video encoder for encoding the aforesaid signal at the rate of 60 fields/second to a bitstream in accordance with the description in ISO 13818-2 (MPEG2-Video). A reference numeral 1304 denotes an MPEG2 video decoder for receiving the aforesaid bitstream and reversely converting the received bitstream to the 60$i$ signal at the rate of 60 fields/second. A reference numeral 1305 denotes a double rate converter for doubling the horizontal scanning rate of the 60$i$ signal.

A description will be given to the operation of the conventional progressive signal transmission/reception system thus structured. Since the film material with the rate of 24 frames/second with no alteration normally requires a special-purpose reproducing device or recording device, it is initially converted to the 60$i$ signal at the rate of 60 fields/ second, which is mostly stored in a D1 or S-VHS tape afterward and-distributed.

The 24$p$/60$i$ converter 1302 operates to convert the signal at the rate of 24 frames/second to a signal at the rate of 60 fields/second by appropriately inserting field repeats in the signal at the rate of 24 frames/second.

FIG. 16 is a view for illustrating the operation of the 24/60$i$ converter. In FIG. 16, it is assumed that a sign A1 represents a field image consisting of the odd-numbered lines (lines 1, 3, 5, . . . ) of a frame A sampled at a time 0 and a sign A2 represents a field image consisting of the even-numbered lines (lines 2, 4, 6, . . . ) of the same frame A.

It is also assumed that a sign B1 represents a field image consisting of the odd-numbered lines of a frame B sampled at a time 1 and a sign B2 represents a field image consisting of the even-numbered lines of the frame B.

The difference between the sampling times 0 and 1 is ¹/₂₄ seconds in the case of the film material.

Likewise, a sign C1 represents a field image consisting of the odd-numbered lines of a frame C at a time 2 and a sign C2 represents a field image consisting of the even-numbered lines of the frame C.

On the other hand, a sign D1 represents a field image consisting of the odd-numbered lines of a frame D at a time 3 and a sign D2 represents a field image consisting of the even-numbered lines of the frame D.

An example of an output from the 24$p$/60$i$ converter 1302 is such an output signal as shown in FIG. 16. Specifically, the 24$p$/60$i$ converter 1302 operates to obtain output images (A1, A2), (A1, B2), (B1, C2), (C1, C2), and (D1, D2) having a 5-frame field structure from input images A, B, C, D having a 4-frame frame structure by inserting a field repeat in each of the frames A and C. A sign (f1, f2) is assumed to indicate that a pair of fields f1 and f2 constitute one frame. A sign f1 represents an image consisting of the odd-numbered lines of the frame, while a sign f2 represents an image consisting of the even-numbered lines thereof. The output signal forms a signal at the rate of 60 fields/second.

The signal at the rate of 60 fields/second is inputted to the MPEG2 video encoder 1303.

The MPEG2 video encoder 1303 operates to convert the. inputted video signal to a bitstream compliant with the format described in ISO/IEC 13818-2 and output the bitstream. The bitstream output is connected to the MPEG2 video decoder 1304 via a transmission system.

At this time, there are cases where the MPEG2 video encoder 1303 encodes the entire frames (30 frames per second) of the inputted signal 60$i$ and outputs the encoded frames without any alterations and where the MPEG2 video encoder 1303 detects a field repeat at the encoder side, performs internal processing so as not to transmit the repeated field, and transmits only data at the rate of 24 frames per second.

In the case where the MPEG video encoder 1303 encodes all the frames of the inputted signal 60$i$ and outputs the encoded frames, the MPEG2 decoder 1303 encodes each frame of the video signal inputted thereto into a bitstream and outputs the bitstream.

In the case where the MPEG2 video encoder 1303 detects the field repeat at the encoder side, performs processing so as not to transmit the repeated field, and transmits only data at the rate of n 24 frames per second, the MPEG2 video encoder 1303 transmits only signals representing the 4 frames of A, B, C, and D but converts each of the signals representing the frames A and C to a bitstream in a form obtained by adding 1 to the repeat_first_field flag bit in accordance with the format described in ISO/IEC 13818-2 and outputs the bitstream.

The MPEG2 video decoder 1304 receives the bitstream produced in accordance with the foregoing procedure and performs a reverse operation in accordance with the grammar described in MPEG2 to reconstruct the video signal from the bitstream.

In the case where the MPEG2 video encoder 1303 detects the field repeat in the input signal, performs processing not to transmit the repeated field, and transmits only data at the rate of 24 frames per second, the MPEG2 video decoder 1304 operates as follows.

In the case where the repeat_first_field flag is 1 in the input bitstream, one field of the target frame is repeatedly outputted. In the case where the repeat_first_field flag is 0, the image signal is outputted without performing a field repeat.

Consequently, the output of the MPEG2 video decoder 1304 is the same signal at the rate of 60 fields/second in either of the cases where the entire frames of the input signal 60i are encoded and outputted and the case where the field repeat is detected at the encoder side, processing is performed not to transmit the repeated field, and only data at the rate of 24 frames per second is outputted, resulting in no difference in terms of frame rate and internally constructed image.

The rate doubling unit 1305 receives the output of the MPEG2 video decoder and transforms the signal at the rate of 60 fields/second to a signal having a scanning rate double the scanning rate for a line scanning line, i.e., a frame rate of 60 frames/second.

FIGS. 17(*a*) and 17(*b*) are for illustrating inputs and outputs of the rate doubling unit 1305. In FIGS. 17(*a*) and 17(*b*), it is assumed that the signs A1, A2, B1, B2, C1, C2, D1, D2, A, B, C, and D represent the same images as represented by the signs in FIG. 16. As a technique for rate doubling, there is one implemented by a repeat in a field structure and one implemented by a repeat in a frame structure. FIG. 17(*a*) is for illustrating the case where rate doubling is implemented by a repeat in a field structure. FIG. 17(*b*) is for illustrating the case where rate doubling is implemented by a repeat in a frame structure.

In the case where rate doubling is implemented by a repeat in a field structure, the field A1 which is intrinsically image data for an odd field is also used for an even field, thereby achieving effect that a frame at the sampling time for the field A1 is composed of a single field, as shown in FIG. 17(*a*). This enables the obtention of a double rate signal at the rate of 60 frames/second from a signal at the rate of 60 fields/second.

In the case where rate doubling is implemented by a repeat in a frame structure, the field A1 and the field A2 immediately subsequent thereto combine to compose one frame, thereby achieving the effect that the same frame as outputted at the sampling time for the field A1 is also outputted at the sampling time for the field A2. This enables the obtention of a double rate signal at the rate of 60 frames/second from a signal at the rate of 60 fields/second.

In the case shown in FIG. 17(*a*), however, the foregoing conventional structure presents the problem that, though the temporal order of display is A→B→C→D and correct, image quality in the vertical direction is significantly degraded because the same field data is written twice in each of the frame structure.

In the case shown in FIG. 17(*b*), the conventional structure also presents the problem that image quality is degraded because a frame composed of a combination of fields not sampled at the same time, such as (A1, B2) or (B1, C2), is sporadically present and an inter-field difference is particularly large in a scene involving a dynamic motion in the direction of a time axis, though image quality is not degraded in the vertical direction.

DISCLOSURE OF THE INVENTION

In view of the foregoing conventional problems, it is therefore an object of the present invention to provide a progressive image signal transmitting apparatus, a progressive image signal receiving apparatus, and a method and a medium each capable of obtaining, even when an inter-field motion is dynamic, a double rate signal superior to that obtained conventionally and maintaining vertical resolution.

To attain the object, one aspect of the present invention is a progressive image signal receiving apparatus comprising: video decoding means for receiving a bitstream, converting the bitstream to an interlaced video signal and outputting the video signal; frame structure analyzing means for calculating, based on respective signals representing a current frame and a frame which is 1 frame time previous to the current frame each outputted from the video decoding means, a difference between the both frame signals and outputting a specified control signal based on a result of the calculation; and rate doubling means for producing a frame signal based on the video signal outputted from the video decoding means and on the control signal outputted from the frame structure analyzing means to provide a progressive signal at a scanning rate which is a specified number of times as high as a scanning rate of the output signal from the video decoding means.

Another aspect of the present invention is a progressive image signal receiving apparatus comprising: video decoding means for receiving a bitstream and outputting an interlaced video signal; temporary storing means for receiving the output signal from the video decoding means and delaying the signal by a 1 frame time; judging means for calculating, based on a current signal outputted from the video decoding means and a previous frame signal outputted from the temporary storing means, a difference between the both frame signals and outputting a specified control signal based on a result of the calculation; and rate doubling means for producing a frame signal based on the video signal outputted from the temporary storing means and on the control signal outputted from the judging means to provide a progressive signal at a scanning rate which is a specified number of times as high as a scanning rate of the output signal from the temporary storing means.

Still another aspect of the present invention (corresponding to the invention defined in claim 5) is a progressive image signal receiving apparatus, wherein the frame structure analyzing means calculates, in calculating the difference between the both frame signals, the sum of the absolute values of differences between pixels in a part of the current frame and pixels in a part of the previous frame.

Yet another aspect of the present invention is a progressive image signal receiving apparatus comprising: video decoding means for receiving a bitstream, converting the bitstream to a video signal of progressive type, and outputting the video signal; and flag bit analyzing means for detecting, in the bitstream, a flag signal indicating the presence or absence of a field repeat described correspondingly to a frame signal and outputting, to the video decoding means, the presence or absence of the field repeat indicated by the detected flag signal, if the output from the flag bit analyzing means indicates the presence of the field repeat, the video decoding means repeatedly outputting the same frame signal as the frame signal corresponding to the flag signal and outputting the video signal of progressive type at a scanning rate which is a specified number of times as high as a scanning rate of the frame signal in the bitstream.

Still yet another aspect of the present invention (corresponding to the invention defined in claim 7) is a progressive image signal transmitting apparatus for transmitting a video material shot by a sequential scanning (progressive scanning) method in accordance with a bitstream defined in ISO/IEC 13818-2, the transmitting apparatus describing a frame rate of the video material by using a bit position in a user data region in the bitstream and transmitting the frame rate.

A further aspect of the present invention is a progressive image signal receiving apparatus for receiving a bitstream transmitted from a transmitting apparatus and outputting a sequential scanning signal to a progressive monitor, the receiving apparatus comprising: second flag bit analyzing means for recognizing a frame rate of a video material from bit data at a given bit position predefined by agreement with the transmitting apparatus; and video decoding means for receiving an output of the second flag bit analyzing means and the bitstream, determining the frequency of frame repeats based on a ratio between the output of the second flag bit analyzing means and a frame rate displayed on the progressive monitor, reconstructing an image, and outputting a progressive signal.

A still further aspect of the present invention is a progressive image signal receiving apparatus for receiving a bitstream defined in ISO/IEC 13818-2 and outputting a progressive signal, the receiving apparatus comprising: flag bit analyzing means for analyzing whether or not a code value described in a frame_rate_code flag in a sequence_header is half the value of a frame rate of the progressive signal outputted and outputting a result of the analysis as a control signal; video decoding means for receiving the bitstream and reconstructing an image based on the definition in ISO/IEC 13818-2; and rate doubling means for converting, based on the control signal outputted from the flag bit analyzing means, an output signal from the video decoding means to a signal at a scanning rate which is double the scanning rate of the output signal.

With such structures, it is judged whether or not a decoded frame is a frame to be repeatedly displayed at the receiving apparatus and control operation is performed based on the judgment. This achieves double rate display without causing the degradation of image quality.

BRIEF DESCRIPTION OF THE DRAWINGS

FIG. 2 is a view for illustrating the operation of frame structure analyzing means according to the first embodiment of the present invention;

FIG. 5 is a block diagram showing a structure of a progressive image signal transmitting/receiving apparatus according to a third embodiment of the present invention;

FIG. 6 is a view for illustrating the operation of flag bit analyzing means according to the third embodiment of the present invention;

FIG. 9 is a view representing the Sequence_header for illustrating the respective operations of third MPEG video encoding means and the flag bit analyzing means according to the fourth embodiment of the present invention;

FIG. 10 is a view representing the Sequence_extension for illustrating the respective operations of the third MPEG video encoding means and the flag bit analyzing means according to the fourth embodiment of the present invention;

FIG. 11 is a view for illustrating the operation of the MPEG2 video decoding means according to the fourth embodiment of the present invention;

FIG. 12 is a view for illustrating the operation of the flag bit analyzing means according to a fifth embodiment of the present invention;

FIG. 13 is a view for illustrating the operation of the flag bit analyzing means according to the fifth embodiment of the present invention;

FIG. 14($b$) is a view diagrammatically showing a 50$i$ signal according to the embodiment;

FIG. 14($c$) is a view diagrammatically showing a 50$p$ signal according to the embodiment;

FIG. 17($a$) is a view for illustrating a repeating operation performed in a field structure by the conventional progressive image signal transmitting/receiving apparatus; and FIG. 17($b$) is a view for illustrating a repeating operation performed in a frame structure by the conventional progressive image signal transmitting/receiving apparatus.

EXPLANATION OF REFERENCE NUMERALS

Figure 1:
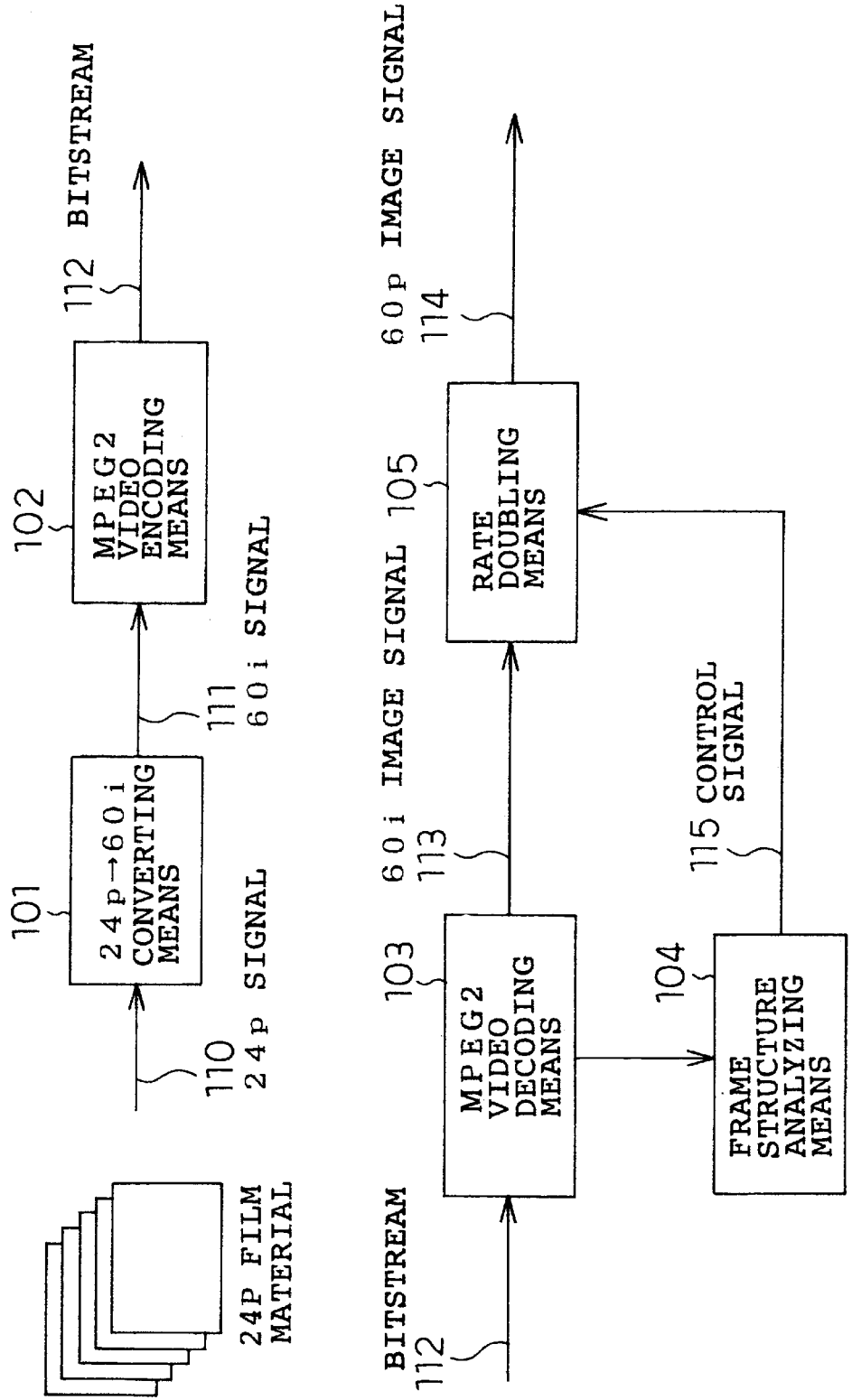
FIG. 1 is a block diagram showing a structure of a progressive image signal transmitting/receiving apparatus according to a first embodiment of the present invention.

| (Explanation of Reference Numerals) | |
|---|---|
| 101 | 24p/60i converting means |
| 102 | MPEG2 video encoding means |
| 103 | MPEG2 video decoding means |
| 104 | frame structure analyzing means |
| 105 | rate doubling means |

BEST MODES FOR IMPLEMENTING INVENTION

Referring now to the drawings, the embodiments of the present invention will be described.

(Embodiment 1)

FIG. 1 is a block diagram showing the respective structures of a receiving apparatus and a transmitting apparatus as an embodiment of a progressive image signal receiving apparatus according to the present invention.

By way of example, the present embodiment will describe the case of obtaining, from a sequential scanning signal (hereinafter referred to as progressive signal) at a rate of 24 frames per second, a progressive signal at a rate of 60 frames per second for ease of explanation.

In FIG. 1, a reference numeral 101 denotes 24P/60$i$ converting means for converting the progressive signal having the rate of 24 frames per second for a film material or the like to an interlace signal having a field structure with a rate of 60 fields per second. A reference numeral 102 denotes MPEG video encoding means for producing a bitstream of an image signal in accordance with the description in ISO/IEC 13818-2, while a reference numeral 103 denotes MPEG2 video decoding means for reconstructing the image signal at the rate of 60 fields/second from the bitstream. A reference numeral 104 denotes frame structure analyzing means for reading frame data from the foregoing video decoding means and calculating a difference between the frame data and data on the previous frame to determine the presence or absence of the difference, while a reference numeral 105 denotes rate doubling means for receiving an output from the foregoing MPEG2 video decoding means 103, adaptably selecting a rate doubling method based on an output control signal from the frame structure analyzing means 104, converting an output image signal from the MPEG2 video decoding means 103 to a signal having a doubled scanning rate, and outputting the signal.

On the other hand, a signal 110 is a 25$p$ signal having a frame rate of 24 frames/second and a signal 111 is a 60$i$ signal having a frame rate of 60 fields/second. A reference numeral 112 denotes a bitstream defined in ISO/IEC 13818-2. A reference numeral 113 denotes a reconstructed 60$i$ image signal having a frame rate of 60 fields/second. A reference numeral 114 denotes a 60$p$ image signal having a doubled frame rate of 60 frames/second. A reference numeral 115 denotes a control signal notifying the rate doubling means 105 of a rate doubling method.

The rate doubling means 105 according to the present embodiment is obtained by improving the conventional rate doubling converter 1305 having the repeating function illustrated in FIG. 17($b$). The difference between the present embodiment and the conventional embodiment will be described briefly with reference to FIG. 3.

Figure 3:
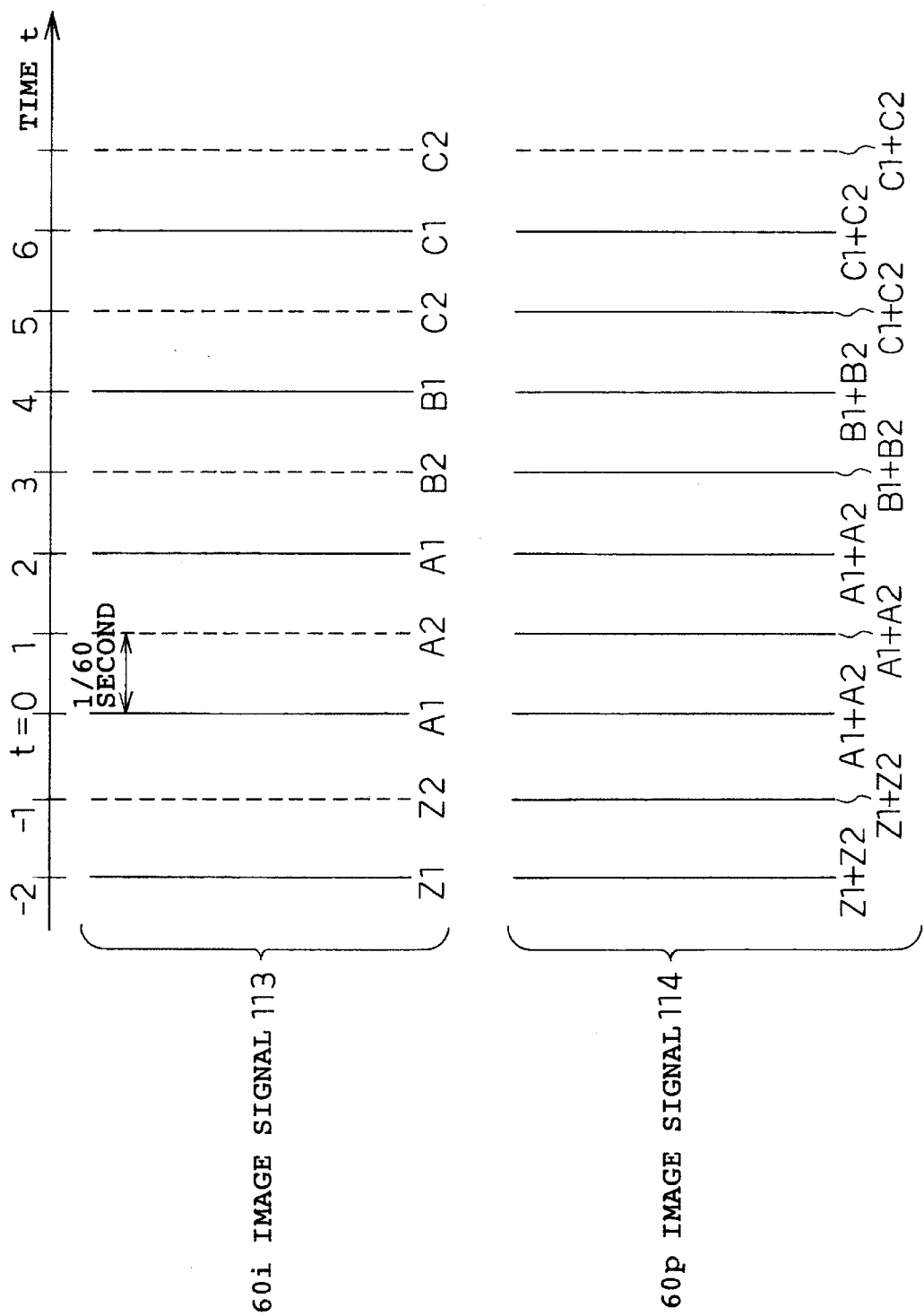
FIG. 3 is a view for illustrating the operation of rate doubling means according to the first embodiment of the present invention.

Specifically, the rate doubling means 105 produces one frame Z1+Z2 by using the fields Z1, Z2 at the time t=−2 and is assumed to repeatedly output the same frame Z1+Z2 even at the time t=−1, as shown in FIG. 3.

Under such circumstances, the rate doubling means 105 according to the present embodiment is different from the conventional case in that it is structured to determine, in generating a frame at the time t=0, whether or not it repeatedly outputs the same frame Z1+Z2 as produced at the time t=−1 based on the control signal from the frame structure analyzing means 104. A specific operation of the rate doubling means 105 will be described later in greater detail.

The reason that the rate doubling means 105 according to the present invention is structured to repeatedly output the same frame signal twice and judge whether or not the same frame signal should be outputted three times is as follows.

Since the present embodiment has described the case of obtaining a progressive signal at the rate of 60 frames per second from a progressive signal at the rate of 24 frames per second, the present embodiment is based on the assumption that the frame rate becomes 60/24=2.5.

Accordingly, in the case of obtaining a progressive signal at the rate of 60 frames per second from a progressive signal at the rate of m frames per second, e.g., the presence or absence of the ([60/m]+1)-th repeat of the frame signal outputted from the rate doubling means 105 according to the present embodiment is judged. It is assumed here that the sign [n] represents a maximum integer not exceeding n.

FIG. 3 is a view for illustrating the operation of the rate doubling means 105. In FIG. 3, the horizontal axis represents time transition and each of the vertical lines represents an image composed of one field. Here, the difference of a numerical value 1 on the time axis corresponds to ⅟60 seconds.

A description will be given to the operation of the progressive signal transmitting/receiving apparatus thus structured. First, the 24$p$/60$i$ converter 101 produces a signal at the rate of 60 fields/second from a material with the rate of 24 frames per second in exactly the same manner as in the description of the conventional technique.

Figure 16:
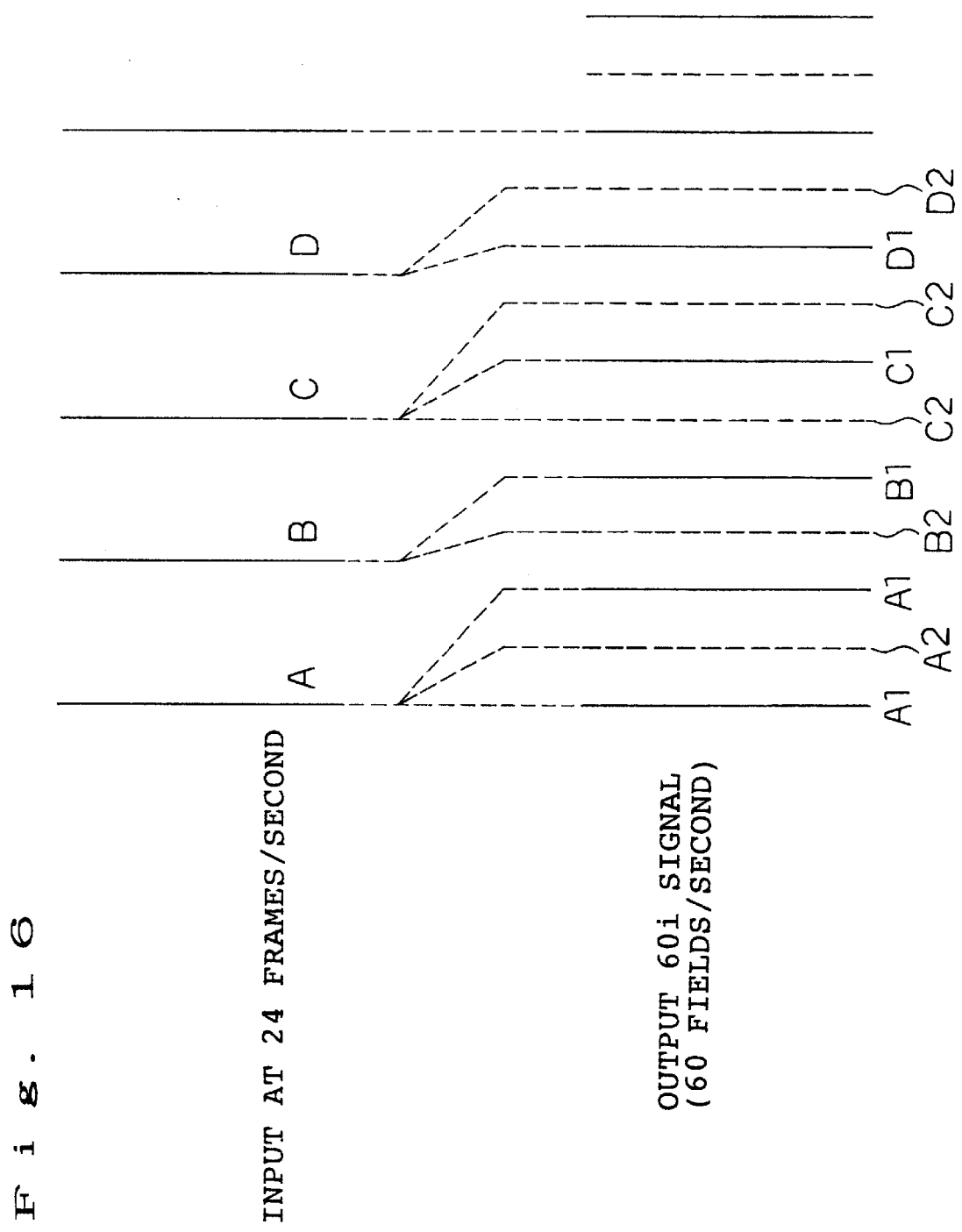
FIG. 16 is a view for illustrating the operation of the conventional progressive image signal transmitting/receiving apparatus.

That is, the relationship between the 24P signal 110 as an input signal and the produced 60$i$ signal 111 at the rate of 60 fields/second is exactly the same as the relationship between the input image and the output image shown in FIG. 16.

The 60$i$ signal 111 is converted by the MPEG2 video encoder means 102 to a bitstream defined in ISO/IEC 13818-2. The bitstream 112 is subjected to arbitrary modulation and demodulation and transmitted to reach the receiver via a transmission path. At the receiver, the bitstream 112 is inputted to the MPEG2 video decoding means 103.

The MPEG2. video decoding means 103 reconstructs an image signal from the bitstream in accordance with the description in ISO/IEC 13818-2.

To judge whether or not the same frame signal should be repeatedly outputted three times, the frame structure analyzing means 104 operates to calculate, for each of the fields, the absolute value of the difference between the value of each pixel in an image being currently decoded by the video decoding means 103 and the value of the corresponding pixel in a frame to be displayed 1 frame time previous thereto at the same horizontal and vertical positions and add up the calculated absolute values to provide a total sum. Briefly, the frame structure analyzing means 104 compares, for each of the mutually corresponding fields, the decoded frame outputted from the MPEG2 video decoding means 103 with the frame to be displayed 1 frame time previous thereto such that the field parities thereof coincide with each other and performs the following calculations.

FIG. 2 is a view for illustrating the operation of the frame structure analyzing means 104.

In FIG. 2, a reference numeral 201 denotes an image frame at the time t=0. For simplicity, the description will be given, by way of example, to the case where one frame is composed of 720 horizontal pixels and 480 vertical lines.

A reference numeral 202 denotes the value of a brightness signal at a location of the y-th pixel (x is an integer) on the x-th horizontal line (x is an integer). The brightness value is expressed as a sign F(x, y).

A reference numeral 203 denotes an image frame at the time t=1. The difference between the times 0 and 1 corresponds to a time difference of ⅟30 seconds. The brightness value at the location x, y in the image frame 203 is represented by G(x, y). At this time, (Numerical Expression 1)

$$\alpha = \sum_{x=2n-1}^{480} \sum_{y=m}^{720} |F(x, y) - G(x, y)|$$

where n=1, 2 . . . 240, m=1, 2 . . . 720
(Numerical Expression 2)

$$\beta = \sum_{x=2n}^{480} \sum_{y=m}^{720} |F(x, y) - G(x, y)|$$

where n=1, 2 . . . 240, m=1, 2 . . . 720

In the foregoing Numerical Expression 1, α represents the sum of the absolute values of the differences between the odd fields. In the foregoing Numerical Expression 2, β represents the sum of the absolute values of the differences between the even fields.

It is assumed that each of α and β is set to a value 0 at the beginning of a field and evaluated as the sum during the period of one frame.

If α or β is smaller than a predetermined threshold value, it is judged that the corresponding field of a frame currently being decoded is a repeat of the preceding field and it is reported as the control signal 115 to the rate doubling means 105 that the corresponding frame contains the repeated field.

Next, a more specific description will be given to the operation of the rate doubling means 105 with reference to FIG. 3.

In the drawing, each of Z1, Z2, A1, A2, B1, B2, C1, and C2 represents one field image and the notation thereof is similar to that used in FIGS. 17(a) and 17(b) and the like illustrating the conventional embodiment.

Figure 15:
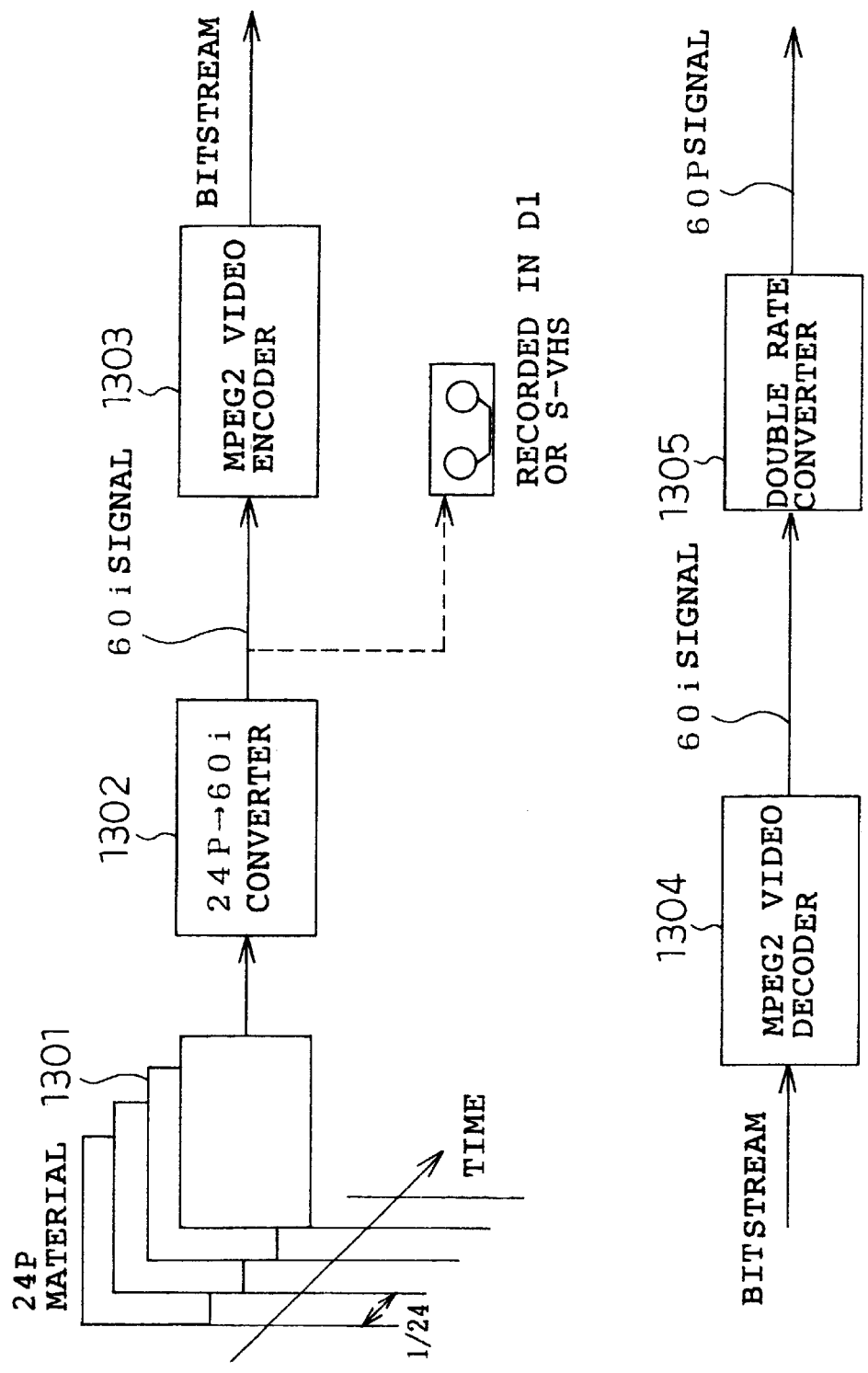
FIG. 15 is a block diagram showing a conventional progressive image signal transmitting/receiving apparatus.

For easier recognition of contrast between the output image signal from the rate doubling means 105 and the output image signal (see FIGS. 17(a) and 17(b)) from the conventional rate doubling converter 1305 (see FIG. 15), FIG. 3 shows the case where an input signal to the rate doubling means 105, which is shown as the 60i image signal 113, is identical to the 60i signal, which is the input signal shown in FIGS. 17(a) and 17(b). In FIG. 3, a portion accompanied by the reference-numeral 113 diagrammatically shows the 60i image signal as the input and a portion accompanied by the reference numeral 114 diagrammatically shows the 60p image signal as the output.

As stated previously, it is assumed that the same frame Z1+Z2 is outputted at the time t=−2 and at the time t=−1.

Next, a description will be given to the operation of the rate doubling means 105 at the time t=0 and thereafter.

At the time t=0, the frame structure analyzing means 104 calculates the sum (corresponding to a in the Numerical Expression (1)) of the absolute values of the differences between the field image Z1 at the time t=−2 and the field image A1 at the time t=0 in FIG. 3. At this time, the value of a becomes larger than the predetermined threshold value so that the frame structure analyzing means 104 transmits, to the rate doubling means 105, the control signal 115 directing that outputting not be repeated as an output operation at the time t=0. Consequently, the rate doubling means 105 uses the field image A1 at the time t=0 as the odd field and the field image A2 at the time t=1 as the even field to produce A1+A2 as one frame and outputs the frame.

At the time t=1, the same frame A1+A2 as outputted at the time t=0 is repeatedly outputted unconditionally.

At the time t=2, the frame structure analyzing means 104 calculates the sum (corresponding to α in the Numerical Expression (1)) of the absolute values of the differences between the field image A1 at the time t=2 and the field image A1 at the time t=0. At this time, the value of α becomes smaller than the predetermined threshold value so that the field image A1 at the time t=2 is judged to be a repeat field of the field image A1 at the time t=0 and the control signal 115 directing that the frame identical to the preceding frame be repeatedly outputted is transmitted to the rate doubling means 105. The rate doubling means 105 accepts the control signal 115 and repeatedly outputs the same frame A1+A2 as outputted at the time t=1 as a double rate output at the time t=2. It follows therefore that the rate doubling means 105 eventually outputs the frame A1+A2 consisting of the field images A1 and A2 three times at the times t=0, 1, 2.

At the time t=3, the sum (corresponding to β in the Numerical Expression (2)) of the absolute values of the differences between the field image B2 at the time t=3 and the field image A2 at the time t=1 is calculated. At this time, since β has a value larger than the predetermined threshold value, the frame structure analyzing means 104 outputs, to the rate doubling means 105, the control signal 115 directing that outputting not be repeated as a double rate output at the time t=3. As a result, the rate doubling means 105 uses the field image B1 at the time t=4 as the odd field and the field image B2 at the time t=3 as the even field to produce B1+B2 as one frame and outputs the frame.

At the time T=4, the rate doubling means 105 repeatedly outputs the same frame as the output frame B1+B2 at the time t=3.

At the time t=5, the sum (corresponding to β in the Numerical Expression (2)) of the absolute values of the differences between the field image B2 at the time t=3 and the field image C2 at the time t=5 is calculated. Since β has a value larger than the predetermined threshold value, the frame structure analyzing means 104 outputs the control signal 115 similar to that outputted when the time=3 to the rate doubling means 105. As a result, the rate doubling means 105 produces C1+C2 as one frame and outputs the frame.

At the time t=6 and thereafter, a and β are calculated in the manner described above and rate doubling is performed by the same procedure.

In general, if α or β calculated as the sum of the absolute values of the field differences at a time n (n is an integer) is larger than a predetermined threshold value, one frame is produced from a field at the time n and a field at the time n+1 as a double rate output at the time n and the same frame is outputted twice at the time n and at the time n+1.

If α or β is smaller than the threshold value, on the other hand, an output at the immediately preceding time(output at a time (n−1)) is repeatedly produced even at the time n.

In the present structure, each of the outputs at the times t=0, 1, 2 is properly composed of the frame consisting of A1 and A2 sampled at the same time so that a double rate output free from image quality degradation is obtained. Moreover, each of the outputs at the subsequent times t=3, 4 can also be composed of the frame consisting of B1 and B2 sampled at the same time so that a double rate output free from image quality degradation is similarly obtained. Furthermore, the output at the subsequent time t=5 can also be composed of the frame consisting of C1 and C2 so that a double rate output free from image quality degradation is similarly obtained.

Thus, double rate conversion can be performed sequentially with respect to a transmitted bitstream resulting from the MPEG2 encoding of the 24p material with the 60i signal without causing image quality degradation.

Although each of x, y in the (Numerical Expression 1), (Numerical Expression 2) has been calculated over the entire region of effective pixels in the present embodiment, exactly the same effects can also be achieved by calculating instead the sum of the absolute values of differences at a finite number of points. To determine the finite number of points, there can be adopted a method of selecting points at random as characteristic points or a method of determining a specified scanning line.

(Embodiment 2)

Below, a second embodiment of the present invention will be described with reference to the drawings.

Figure 4:
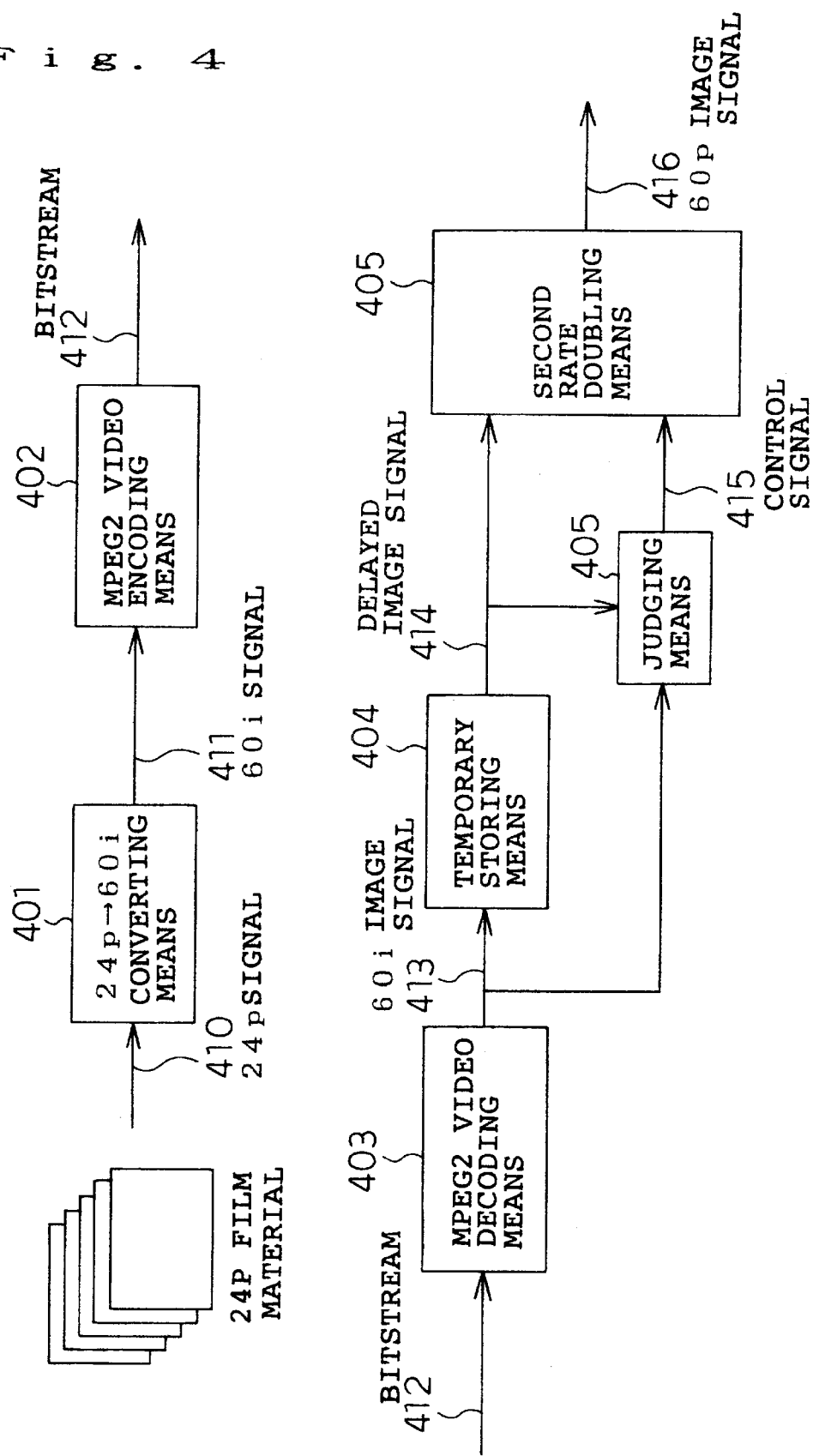
FIG. 4 is a block diagram showing a structure of a progressive image signal transmitting/receiving apparatus according to a second embodiment of the present invention.

FIG. 4 is a block diagram showing the respective structures of a receiving apparatus and a transmitting apparatus as an embodiment of the progressive image signal receiving apparatus according to the present invention.

For simplicity, the description will be given to the case where a progressive signal at a rate of 60 frames per second is obtained from a progressive signal at a rate of 24 frames per second, similarly to the first embodiment.

In FIG. 4, a reference numeral 401 denotes 24p/60i converting means for converting a progressive signal having the rate of 24 frames per second for a film material or the like to a 60i signal having a field structure with a rate of 60 fields per second. A reference numeral 402 denotes an MPEG2 video encoding means for producing a bitstream in accordance with the description in ISO/IEC 13818-2. A reference numeral 403 denotes an MPEG2 video decoding means for reconstructing the 60i image signal at the rate of 60 fields/second from the aforesaid bitstream. The foregoing structure is the same as in the first embodiment.

A reference numeral 404 denotes temporary storing means for receiving an output of the MPEG2 video decoding means 403 and delaying the current frame by a 1 frame time. A reference numeral 405 denotes judging means for performing an operation between respective signals representing the current frame and the immediately preceding frame based on the output of the MPEG2 video decoding means 403 and an output of the temporary storing means 404. A reference numeral 406 denotes second rate doubling means for receiving the output of the temporary storing means 404 and an output of the judging means 405, adaptably selecting a rate doubling method for the output signal from the temporary storing means 404 based on the control signal from the aforesaid judging means 405, and outputting a double rate signal 416.

A reference numeral 410 denotes a 24p signal having a frame rate of 24 frames/second. A reference numeral 411 denotes a 60i signal having a frame rate of 60 fields/second. A reference numeral 412 denotes a bitstream defined in ISO/IEC 13818-2. A reference numeral 413 denotes a 60i image signal having a frame rate of 60 fields/second. A reference numeral 414 denotes a delayed image signal which has been delayed by a 1 frame time. A reference numeral 415 denotes an output control signal for the judging means. A reference numeral 416 denotes a 60p image signal having a doubled frame rate of 60 frames/second.

A description will be given to the operation of the progressive signal transmitting/receiving apparatus thus structured.

First, the 24p/60i converter 401 produces the 60i signal 411 at the rate of 60 fields/second from the material with the rate of 24 frames per second in exactly the same manner as described in the first embodiment and outputs the 60i signal 411 to the MPEG2 video encoding means 402. The 60i signal 411 is converted by the MPEG2 video encoding means 402 to the bitstream defined in ISO/IEC 13818-2, which forms the bitstream 412.

The bitstream 412 is subjected to arbitrary modulation and demodulation and transmitted to reach the receiver via a transmission path. At the receiver, the bitstream 412 is inputted to the MPEG2 video decoding means 403.

The MPEG2video decoding means 403 reconstructs an image from the bitstream in accordance with the description in ISO/IEC 13818-2.

The temporary storing means 404 receives the result of decoding from the MEG2 video decoding means 403 and outputs it after delaying it by a 1 frame time.

The judging means 405 calculates, for each of the fields, the sum of the absolute values of the differences between pixels at the corresponding locations from the current 60i image signal 413 and the delayed image signal 414 which is 1 frame time previous thereto. It is assumed that the numerical expressions for the calculation are the same as shown in (Numerical Expression 1) and (Numerical Expression 2).

In other words, the judging means 405 notifies, via the control signal 415, the second rate doubling means 406 of whether or not the frame of concern contains a repeat field by calculating the difference between the current field and the field which is 1 frame time previous thereto in accordance with the Numerical Expressions 1 and 2 and performing a comparison between the difference and a predetermined threshold value.

The second rate doubling means 406 operates in exactly the same manner as the rate doubling means 105 according to the first embodiment so that it uses the control signal 415 from the judging means 405 to convert the delayed image signal 414 to a double rate signal and output the 60p image signal 416.

Thus, even in the case where the MPEG2 video decoding means 403 has the conventional structure incapable of calculating the sum of the absolute values of the differences, the temporary storing means 404 and the judging means 405 according to the present embodiment enables the obtention of a double rate output which does not cause the degradation of image quality in a sequence of frames.

Although the present second embodiment has used the (Numerical Expression 1) and (Numerical Expression 2) to calculate each of i, j over the entire region of effective pixels, similarly to the first embodiment, exactly the same effects can also be achieved by calculating instead the sum of the absolute values of differences at a finite number of points.

On the other hand, a control signal representing a changeover between frames is needed as a trigger since the values should be cleared to 0 at the beginning of the frame in calculating α and β represented by (Numerical Expression 1) and (Numerical Expression 2). By contrast, if the 60i image signal 413 is transmitted in accordance with the REC656 format defined by CCIR, the beginning of the frame can be judged with the code defined in REC656 so that it is no more necessary to input an additional control signal indicating the beginning of the frame.

(Embodiment 3)

FIG. 5 is a block diagram showing the respective structures of a receiving apparatus and a transmitting apparatus as an embodiment of the progressive image signal receiving apparatus according to the present invention.

For simplicity, the present embodiment will describe, by way of example, the case where a progressive signal at a rate of 60 frames per second is obtained from a progressive signal at a rate of 24 frames per second.

In FIG. 5, a reference numeral 501 denotes 24p/60i converting means for converting a 24p signal having the rate of 24 frames per second for a film material or the like to a 60i signal having a field structure with a rate of 60 fields per second. A reference numeral 502 denotes second MPEG2 video encoding means for producing a bitstream of a video signal in accordance with the description in ISO/IEC 13818-2. A reference numeral 503 denotes flag bit analyzing means for analyzing the content of a specific flag bit in the bitstream. A reference numeral 504 denotes second MPEG2 video decoding means for selectively switching the rate doubling method and reconstructing the image signal at the rate of 60 frames/second from the bitstream based on the control signal from the flag bit analyzing means 503.

A reference numeral 510 denotes a progressive signal having a frame rate of 24 frames/second. A reference numeral 511 denotes a 60*i* signal having a frame rate of 60 fields/second. A reference numeral 512 denotes a bitstream defined in ISO/IEC13818-2. A reference numeral 513 denotes a control signal for notifying the second MPEG2 video decoding means 504 of a rate doubling method. A reference numeral 514 denotes a 60*p* image signal having a frame rate of 60 frames/second.

A description will be given to the operation of the progressive signal transmitting/receiving apparatus thus structured.

First, the a 24*p*/60*i* converter 501 produces a signal at the rate of 60 fields/second from the material with the rate of 24 frames per second in exactly the same manner as in the description of the conventional technique.

Accordingly, the relationship between the 24*p* signal 510 as the input signal and the produced 60*i* signal 511 at the rate of 60 fields/second is exactly the same as the relationship between the input image and the output image shown in FIG. 16.

The 60*i* signal 511 is converted by the second MPEG2 video encoding means 502 to a bitstream defined in ISO/IEC 13818-2, which forms the bitstream 512.

FIG. 6 is a view for illustrating the structure of the bitstream 512, which shows the picture_coding_extension defined in ISO/IEC 13818-2. In FIG. 6 represented as a program function, each of the "rows" corresponds to a physical bit string. It can also be said that FIG. 6 shows the state of the bitstream in terms of hardware.

In the present embodiment, the second MPEG2 encoding means 502 receives the input 60*i* signal 511, detects a field that has been repeated internally of the input signal 511, and encodes a frame containing the repeated field by assuming the repeat_first_field bit in the picture_coding_extension to be 1. Consequently, the input 60*i* signal, which is at the rate of 30 frames per second, is converted to the bit string at the rate of only 24 frames per second, which is outputted as the bitstream 512.

The bitstream 512 is transmitted via arbitrary modulation and demodulation to reach the receiver via a transmission path. At the receiver, the bitstream 512 is inputted to the second MPEG2 video decoding means 504. The second MPEG2 video decoding means 504 reconstructs the image from the bitstream in accordance with the description in ISO/IEC 13818-2.

The flag bit analyzing means 503 notifies, via the control signal 513, the second MPEG2 video coding means 504 of whether or not the frame to be subsequently displayed is with the repeat_first_field flag.

Figure 7:
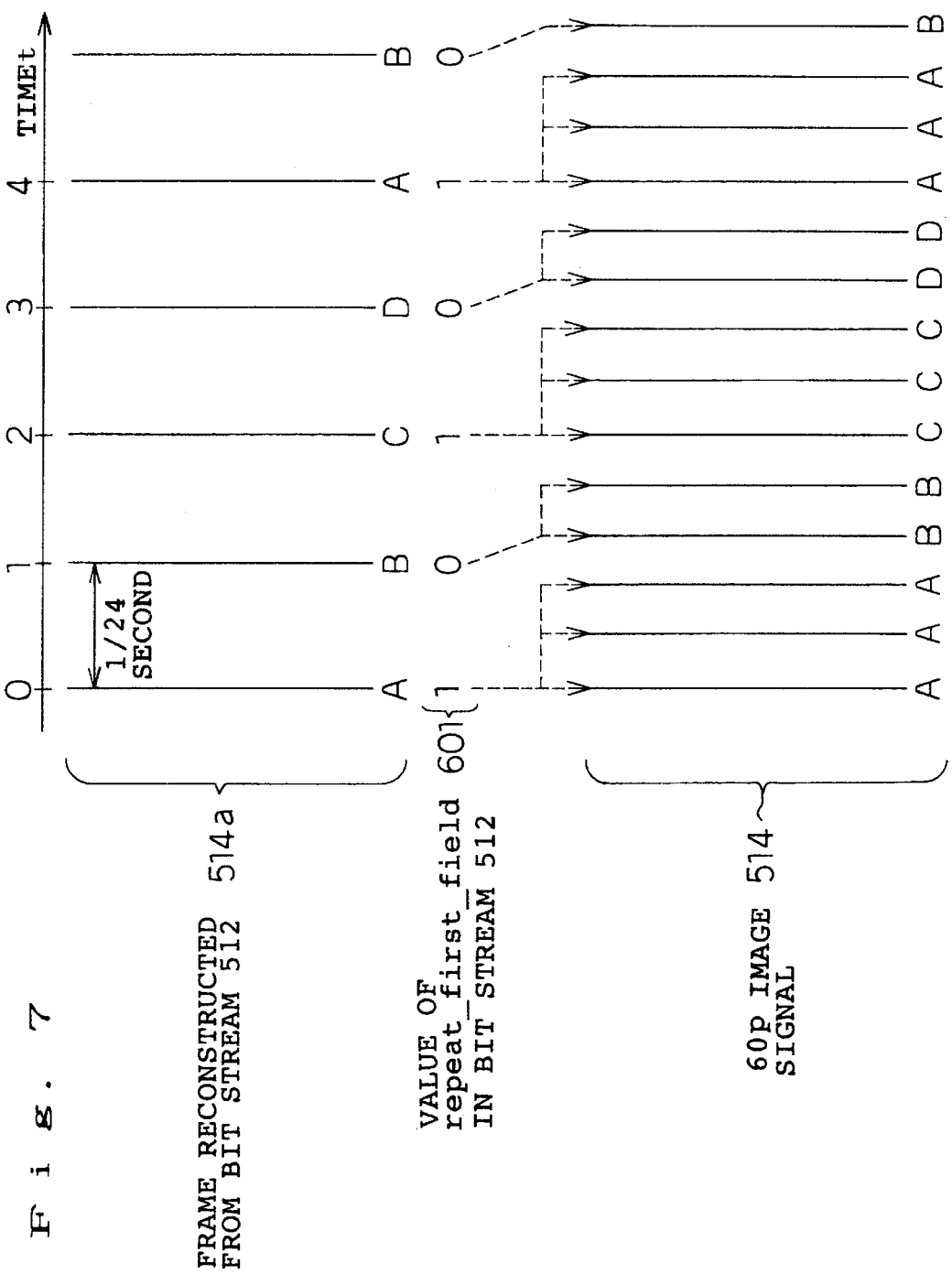
FIG. 7 is a view for illustrating the operation of MPEG2 video decoding means according to the third embodiment of the present invention.

FIG. 7 is a view for illustrating the operation of the second MPEG2 decoding means 504.

In FIG. 7, the frames A, B, C, and D each reconstructed from the bitstream and accompanied by a reference numeral 514*a* represent respective frame data transmitted at the times t=0, 1, 2, and 3 in accordance with the format of ISO/IEC13818-2.

The value 1 or 0 accompanied by a reference numeral 601 represents the value of the repeat_first_field in the bitstream 512 that accompanies the corresponding frame.

The second MPEG2 decoding means 504 according to the present embodiment is different from the MPEG2 decoding means 103 (see FIG. 1) according to the foregoing embodiment in that it receives the bitstream 512 and directly produces the 60*p* image signal without producing the 60*i* image signal.

That is, the second MPEG2 decoding means 503 is notified by the output control signal 513 from the flag bit analyzing means 503 of whether the repeat_first_field is 1 or 0. During display at the rate of 60 frames/second, if the repeat_first_field in a frame is 1, the second MPEG2 decoding means 504 repeatedly outputs the frame three times. If the repeat_first_field in a frame is 0, the second MPEG2 decoding means 504 operates to repeatedly output the frame twice.

FIG. 7 shows an example of the case where the repeat_first_field is added. FIG. 7 shows the case where the repeat_first_field flag in each of the frames A and C is 1 and AAABBCCCDD is outputted at that time.

The present structure allows the second MPEG2 decoding means 504 to produce the 60*p* image signal at the rate of 60 frames/second, in which frames are interpolated in proper temporal order, from the bitstream encoded from the material with the rate of 24 frames/second.

(Embodiment 4)

Figure 8:
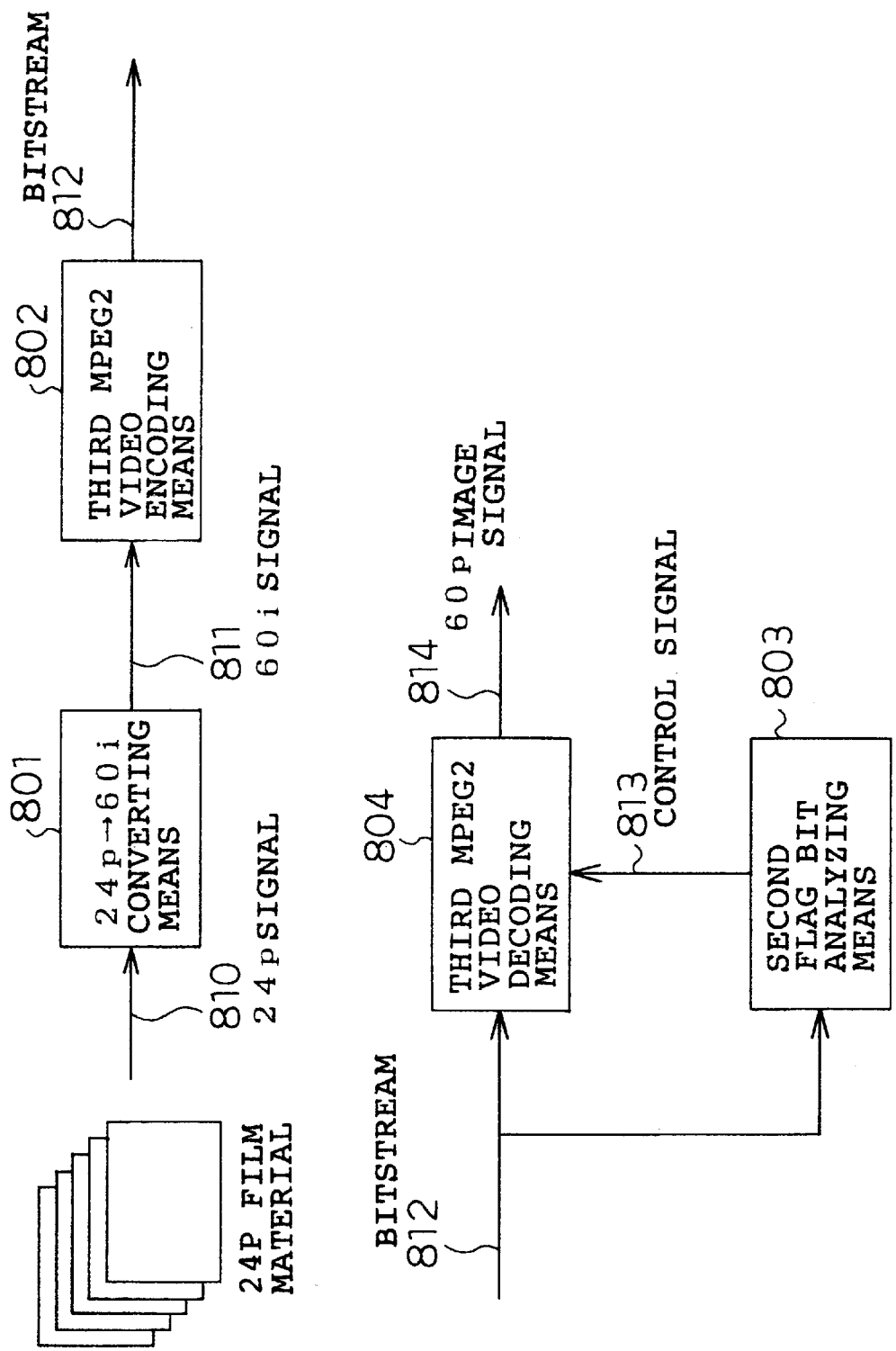
FIG. 8 is a block diagram showing a structure of a progressive image signal transmitting/receiving apparatus according to a fourth embodiment of the present invention.

FIG. 8 is a block diagram showing the respective structures of a receiving apparatus and a transmitting apparatus as an embodiment of the progressive image signal receiving apparatus according to the present invention.

For simplicity, the present embodiment will describe, by way of example, the case where a progressive signal at a rate of 60 frames per second is obtained from a progressive signal at a rate of 24 frames per second.

In FIG. 8, a reference numeral 801 denotes 24*p*/60*i* converting means for converting the progressive signal having the rate of 24 frames per second for a film material or the like to a 60*i* signal having a field structure with a rate of 60 fields per second. The 24*p*/60*i* converting means 801 operates similarly to the 24*p*/60*i* converting means 101 according to the first embodiment. A reference numeral 802 denotes third MPEG2 video encoding means for producing a bitstream of a video signal in accordance with the description in ISO/IEC 13818-2. A reference numeral 803 denotes second flag bit analyzing means for analyzing the content of a specific flag bit in the bitstream. A reference numeral 804 denotes third MPEG2 video decoding means for selectively switching the rate doubling method and reconstructing the image signal at the rate of 60 frames/second from the bitstream based on the control signal from the second flag bit analyzing means 803.

A reference numeral 810 denotes a 24*p* signal having a frame rate of 24 frames/second. A reference numeral 811 denotes a 60*i* signal having a frame rate of 60 fields/second. A reference numeral 812 denotes a bitstream defined in ISO/IEC 13818-2. A reference numeral 813 denotes a control signal for analyzing a specific bit in the bitstream and notifying the third MPEG2 video decoding means 804 of a rate doubling method. A reference numeral 814 denotes a 60*p* image signal having a frame rate of 60 frames/second.

A description will be given to the operation of the progressive signal transmitting/receiving apparatus thus structured.

First, the 24*p*/60*i* converter 801 produces the signal at the rate of 60 fields/second from a material with the rate of 24 frames per second in exactly the same manner as in the part dedicated to the description of the prior art.

Next, an output of the 24p/60i converting means 801 is inputted to the third MPEG2 video encoding means 802.

In the present embodiment, the third MPEG2 encoding means 802 receives the input 60i signal 811, detects a field that has been repeated internally of the 60i signal 811, and does not transmit the portion of the 60i signal 811 corresponding to the repeated field.

FIGS. 9 and 10 are views for illustrating the operation of the third MPEG2 video encoding means 802 and the like according to the present embodiment, of which FIG. 9 shows a Sequence_header defined in ISO/IEC 13818-2 and FIG. 10 shows a Sequence_extension defined in ISO/IEC 13818-2.

In FIGS. 9 and 10 each represented as a program function, each of the "rows" corresponds to a physical bit string. It can also be said that each of FIGS. 9 and 10 shows the state of the bitstream in terms of hardware, similarly to FIG. 6.

The third video encoding means 802 operates to construct a bitstream by writing 1 in the frame_rate_code bit shown in FIG. 9 and writing 1 in the progressive-sequence bit shown in FIG. 10.

Although the present embodiment does not use the repeat_first_field bit used in the third embodiment described above, a signal at the rate of 30 frames per second is eventually transmitted at the rate of 24 frames per second.

The bitstream 812 is transmitted via arbitrary modulation and demodulation to reach the receiver via a transmission path. At the receiver, the bitstream 812 is inputted to the third MPEG2 video decoding means 804.

The third MPEG2 video decoding means 804 reconstructs an image from the bitstream in accordance with the description in ISO/IEC 13818-2.

If the progressive_sequence flag bit shown in FIG. 10 is 1, the second flag bit analyzing means 803 calculates the number of times of frame repeats based on a ratio between the value described in the frame_rate_code and a frame rate to be displayed.

Since the present embodiment has considered the case where the material is a 24p signal, it is assumed that the frame_rate_code=2, which is defined in MPEG2 (ISO/IEC 13818-2) as a value indicating 24 Hz, has been added to the bitstream 812.

If the output frame rate of the receiving apparatus is assumed to be 60 Hz, the ratio thereof to 24 Hz can be calculated to be 2:5. Accordingly, if a frame repeat is performed to construct 5 output frames relative to 2 input frames, it is obvious that the input/output ratio is maintained. Hence, the second flag bit analyzing means 803 notifies, via the control signal 813, the third video decoding means 804 that a frame repeat be performed to maintain the input/output frame ratio.

Below, a detailed description will be given to the operation of the third MPEG2 video decoding means 804 with reference to FIG. 11.

FIG. 11 is a view for illustrating the operation of the third MPEG2 decoding means 804.

The third MPEG2 decoding means 804 performs a frame repeat based on the output control signal 813 from the second flag bit analyzing means 803, as shown in FIG. 11, and produces an output.

In FIG. 11, the frames A, B, C, and D each reconstructed from the bitstream and accompanied by a reference numeral 814a are respective 24p image signals produced when images are reconstructed from the bitstream 812 transmitted at the times t=0, 1, 2, 3 in accordance with the format of ISO/IEC 13818-2 within the video decoding means 804.

It is to be noted that, since the A, B, C, and D of the image signal 812 are constructed within the third video decoding means 804, they do not come out of the third video decoding means directly as external signals but form the 24p image signals when images are constructed from the bitstream 812 in accordance with the ISO/IEC 13818-2.

From the output of the second flag bit analyzing means 803, it has been understood that the frequency of frame repeats is adjusted properly if five output frames are produced relative to two input frames. As a result, the third video decoding means 804 repeats each of the frames A and C three times and each of the frames B and D twice to eventually output the 60p image signal, as indicated by the image signal accompanied by the reference numeral 814 in FIG. 11.

The present structure allows the third MPEG2 decoding means 804 to produce the 60p image signal output at the rate of 60 frames/second,.in which frames are interpolated in proper temporal order, from the bitstream encoded from the material with the rate of 24 frames/second.

Although the present embodiment has described the case where only the frames A and C are repeated three times in the description of the operation of the third video decoding means 804, another frame may also be repeated provided that the frequency of repeats is maintained at 2:5. In that case also, the 60p signal in correct order of display is obtained in exactly the same manner. In short, it is sufficient to repeat a frame such that a specified ratio is maintained between the number of input frames and the number of output frames irrespective of the frame to be repeated. Accordingly, exactly the same effects can be achieved if such an image signal as AABBBCCCDD is outputted by repeating each of the frames B and C three times.

Since the present invention is for performing double speed conversion with respect to a material which is progressive without impairing the image quality thereof, considerations will be given only to the bitstream accompanied by the progressive_sequence=1 and a technique used when the material has a field structure (in the case where progressive_sequence=0) will not be mentioned herein.

(Embodiment 5)

FIG. 8 is a block diagram showing the respective structures of a receiving apparatus and a transmitting apparatus as an embodiment of the progressive image signal receiving apparatus according to the present invention.

The structure according to the present embodiment is the same as the structure according to the foregoing fourth embodiment except for the third MPEG2 encoding means 802. Specifically, the third MPEG2 encoding means 802 according to the present embodiment uses a bit field of extension_and_user_data (0) defined in ISO/IEC 13818-2 shown in FIG. 9, while the third MPEG2 encoding means 802 according to the foregoing embodiment adds 1 to each of the frame_rate_code flat bit and the progressive_frame flag bit prior to transmission. The present embodiment will also describe, by way of example, the case where a progressive signal at the rate of 60 frames per second is obtained from a progressive signal at the rate of 24 frames, similarly to the foregoing.

FIG. 12 is a view for illustrating a method of using the extension_and_user_data (0) in the present embodiment.

In FIG. 12 represented as a program function, each of the rows corresponds to a physical bit string. It can also be said that FIG. 12 shows the state of the bitstream in terms of hardware, similarly to FIG. 6.

Since the user_data_start_code is 0xB2 in hexadecimal notation as defined in ISO/IEC 13818-2, data headed by 0x000001B2 herein forms user data.

FIG. 13 is a view for illustrating the meaning of the 4-bit value of the frame_code contained in FIG. 12.

In FIG. 13 represented as a program function, each of the rows corresponds to a physical bit string. It can also be said that FIG. 13 shows the state of the bitstream in terms of hardware, similarly to FIG. 6.

If the frame_code is 0000 0001 in FIG. 13, for example, it explicitly indicates that the material is an interlace signal at the rate of 24 frames/second. Likewise, it is assumed that, if the frame_code is 0000 1000, it indicates a progressive signal at the rate of 23.976 frames/second.

If the material is a progressive signal having a frame rate of 23.976 Hz, for example, the user data field becomes "0x000001B208".

The bit string thus encoded by using the extension_and_user_data(0) field is subjected to necessary modulation and inputted to the third MPEG2 decoding means 804 and to the second flag bit analyzing means 803 via a transmission system, similarly to the fourth embodiment.

The second flag bit analyzing means 803 calculates the frame rate ratio not by using the frame_rate_code and the progressive_sequence but by judging from the content of the description of the extension_and_user_data (0). Except for this, the second flag bit analyzing means 803 operates in exactly the same manner as in the fourth embodiment.

The third MPEG2 decoding means 804 receives the control signal 813 from the second flag bit analyzing means 803 and produces an output by performing frame repeats in the same manner as shown in, e.g., FIG. 11.

The present structure allows the third MPEG2 decoding means 804 to produce the 60*p* image signal, in which frames are interpolated in proper temporal order, at the rate of 60 frames/second from the bitstream encoded from the material at the rate of 24 frames/second.

Although the present embodiment has described the case where the bit representing the frame rate of the material is placed in the extension_and_user data(0), it is not limited thereto. If user data according to the extension_and_user_data(1) or extension_and_user_data(2) is used instead, exactly the same effects can be achieved.

Thus, the progressive image signal transmitting/receiving apparatus according to the foregoing embodiments are structured to have the MPEG2 video encoding means for converting an input image signal to a bitstream defined in ISO/IEC 13818-2, the MEPG2 video decoding means for reconstructing the image signal from the aforesaid bitstream, the frame structure analyzing means for calculating an inter-frame difference from a frame image produced in the process of decoding operation performed by the aforesaid MPEG2 video decoding means, and the rate doubling means connected to the aforesaid MPEG2 decoding means and to the frame structure analyzing means to perform rate doubling based on a control signal indicating the presence or absence of the inter-frame difference that has been outputted from the frame structure analyzing means.

Alternatively, the progressive image signal transmitting/receiving apparatus according to the foregoing embodiments are structured to have the MPEG2 video encoding means for converting an input image signal to a bitstream defined in ISO/IEC 13818-2, while simultaneously describing the frame structure of the material image and frame rate data at bit positions predetermined during transmission and reception, the MPEG2 video decoding means for reconstructing the image signal from the bitstream, the flag bit analyzing means for judging whether or not the frame is a frame to be repeated from the predetermined bits in the MPEG2 bitstream, and the rate doubling means connected to the aforesaid MPEG2 decoding means and to the aforesaid flag bit analyzing means to double the scanning rate of the output of the MPEG2 video decoding means based on the control signal outputted from the flag bit analyzing means.

With such structures, it is judged whether or not a specified frame decoded at the receiving apparatus is a frame to be repeatedly displayed and control operation is performed based on the judgment. This enables double rate display without causing the degradation of image quality.

It is also possible to produce a recording medium such as a magnetic disk or an optical disk having a program recorded thereon for causing all or a part of means of the signal transmitting apparatus or signal receiving apparatus according to each of the foregoing embodiments to be implemented by a computer and cause the computer to perform the operations as described above. Such a structure achieves the same effects as described above.

Although each of the foregoing embodiments has described the case where the video material has the progressive structure (24*p*) at the rate of 24 frames per second, which is represented by a film, and the output image is the video signal (60*p*) of progressive type at the rate of 60 frames per second, it is not limited thereto. Similar effects can be achieved by exactly the same procedure in any other case where, e.g., the video material is 25*p*, 48*p*, or 72*p* and the output side is 50*p*, 750*p*, or 1080*p*.

A brief description will be given to the respective structures of the receiving apparatus and the transmitting apparatus in the case where the material is 24*p* and the output side is 50*p* with reference to FIG. 1. In this case, the structures can easily be implemented by replacing the 24*p*/60*i* converting means 101 with 24*p*/50*i* converting means for receiving a 24*p* signal, converting the input signal to a 50*i* signal, and outputting the 50*i* signal and by performing the replacement of the MPEG2 video decoding means 103, the rate doubling means 105, and the like with similar intention. After such replacements, therefore, an output of the 24*p*/50*i* converting means is a 50*i* signal, an output of the MPEG2 video decoding means is a 50*i* image signal, and an output of the rate doubling means 105 is a 50*p* image signal. Such structures achieve the same effects as achieved by the structure of FIG. 1.

Figure 14:
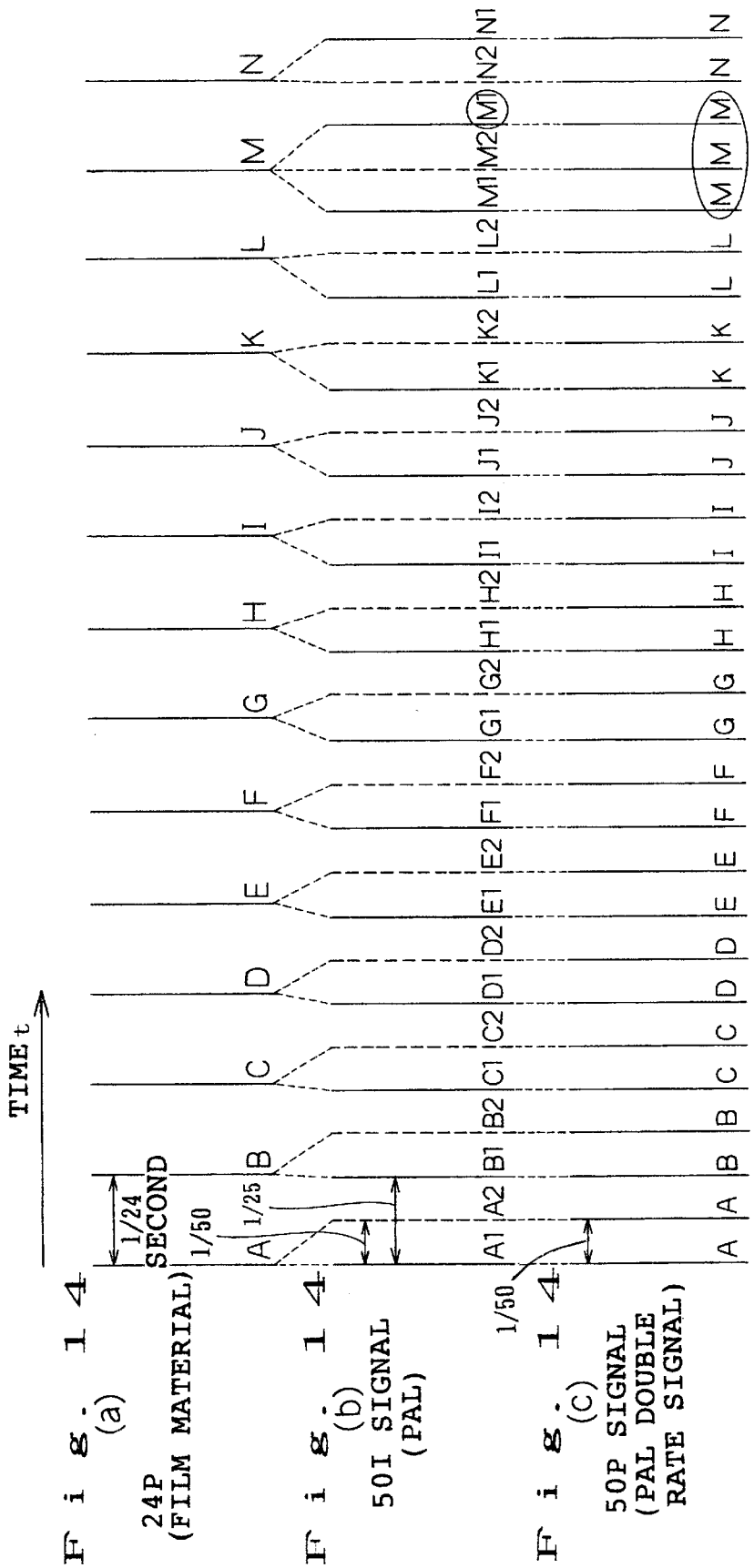
FIG. 14($a$) is a view diagrammatically showing a 24$p$ signal in the case where a material is 24$p$ and an output signal is 50$p$ according to another embodiment of the present invention.

FIGS. 14(*a*), 14(*b*), and 14(*c*) are views diagrammatically showing correspondences among the 24*p* signal, the 50*i* signal (PAL), and the 50*p* signal (PAL double rate signal) in this case. In the drawings, each of the frames A to L is repeated twice and the frame M is repeated three time. Thereafter, the repetitions are performed twice and three times at the same intervals.

In the drawings, each of A1 to N2 diagrammatically represents one field image and the notation thereof is the same as in the cases shown in FIGS. 16, 17(*a*), 17(*b*), and the like. For example, the portion accompanied by A1 is the first field (top field, odd field) of the frame A and the portion accompanied by A2 is the second field (bottom field, even field) of the frame A.

The same replacements as described above may also be performed in FIG. 4. In this case, the structures can easily be implemented by replacing the 24*p*/60*i* converting means 401 with 24*p*/50*i* converting means and performing the replacement of the MPEG2 video decoding means 403, the rate doubling means 405, and the like with similar intention. After such replacements, therefore, an output of the 24*p*/50*i* converting means is a 50*i* signal, an output of the MPEG2 video decoding means is a 50*i* image signal, and an output of the rate doubling means 105 is a 50*p* image signal. Such structures achieve the same effects as achieved by the structure of FIG. 4.

The same replacements as described above may also be performed in FIG. 5. In this case, the structures can easily be implemented by replacing the 24p/60i converting means 501 with 24p/50i converting means and performing the replacement of the second MPEG2 video decoding means 504 and the like with similar intention. After such replacements, therefore, an output of the 24p/50i converting means is a 50i signal and an output of the second MPEG2 video decoding means is a 50p image signal. Such structures achieve the same effects as achieved by the structure of FIG. 5.

Thus, according to the present embodiment, a repeated field can be detected by calculating the difference in the decoded image even when data on the material is not provided at the transmitter and optimum rate doubling as stated previously can be performed by following an appropriate rate doubling procedure.

Moreover, optimum rate doubling conversion can be performed by describing the frame rate of the material at the transmitter, transmitting it to the receiver, and restoring the data at the receiver.

As is apparent from the foregoing description, the present invention has the advantage of producing a double rate signal superior to that produced conventionally and maintaining vertical resolution even when inter-field motion is dynamic.

INDUSTRIAL APPLICABILITY

As described above, the present invention provides the progressive image signal transmitting apparatus, the progressive image signal receiving apparatus, and the medium each capable of producing a double rate signal superior to that produced conventionally and maintaining vertical resolution even when inter-field motion is dynamic.

What is claimed is:

1. A progressive image signal receiving apparatus for receiving a bitstream transmitted from a transmitting apparatus and outputting only a sequential scanning video signal to a progressive monitor, said receiving apparatus comprising:

the progressive monitor having a permanently fixed scanning rate;

second flag bit analyzing means for recognizing a frame rate of a video material from bit information at a given bit position predefined by agreement with said transmitting apparatus, determining a frequency of frame repeats based on a ratio between the recognized frame rate and the fixed scanning rate of the progressive monitor and outputting said frequency of frame repeats; and video decoding means for receiving an output of said second flag bit analyzing means and said bitstream, and reconstructing an image by performing said frame repeats according to said frequency of frame repeats, and outputting only a sequential scanning video signal to the progressive monitor.

2. The progressive image signal receiving apparatus according to claim 1, wherein said bitstream transmitted is a bitstream defined in ISO/IEC 13818-2.

3. The progressive image signal receiving apparatus according to claim 2, wherein said second flag bit analyzing means recognizes said frame rate from an extension__and__ user__data (0) bit field, an extension__and__user__data (1) bit field, or an extension__and__user__data (2) bit field in said bitstream defined in ISO/IEC 13818-2.

4. A progressive image signal receiving apparatus for receiving a bitstream defined in ISO/IEC 13818-2 and outputting a progressive signal, said receiving apparatus comprising:

flag bit analyzing means for analyzing whether or not a code value described in a frame__rate__code flag in a sequence__header is half the value of a frame rate of said progressive signal outputted and outputting a result of the analysis as a control signal;

video decoding means for receiving said bitstream and reconstructing an image based on said definition in ISO/IEC 13818-2; and rate doubling means for converting, based on said control signal outputted from said flag bit analyzing means, an output signal from said video decoding means to a signal at a scanning rate which is double the scanning rate of the output signal.

5. A medium having a program causing all or a part of means of a progressive image signal receiving apparatus as recited in claims 1, 2, 3, or 4 to be implemented by a computer.

* * * * *